United States Patent
Yamazaki

(10) Patent No.: US 10,880,212 B2
(45) Date of Patent: Dec. 29, 2020

(54) TIME SLOT DESIGNING DEVICE, TIME SLOT DESIGNING METHOD, AND RECORDING MEDIUM HAVING TIME SLOT DESIGNING PROGRAM STORED THEREON

(71) Applicant: NEC Corporation, Tokyo (JP)

(72) Inventor: Satoshi Yamazaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 2 days.

(21) Appl. No.: 16/090,623

(22) PCT Filed: Apr. 10, 2017

(86) PCT No.: PCT/JP2017/014688
§ 371 (c)(1),
(2) Date: Oct. 2, 2018

(87) PCT Pub. No.: WO2017/179540
PCT Pub. Date: Oct. 19, 2017

(65) Prior Publication Data
US 2019/0149466 A1   May 16, 2019

(30) Foreign Application Priority Data
Apr. 12, 2016   (JP) .................... 2016-079520

(51) Int. Cl.
*H04L 12/741* (2013.01)
*H04L 12/721* (2013.01)
*H04L 12/861* (2013.01)

(52) U.S. Cl.
CPC .............. *H04L 45/74* (2013.01); *H04L 45/34* (2013.01); *H04L 49/9042* (2013.01)

(58) Field of Classification Search
CPC ...... H04L 45/34; H04L 45/74; H04L 49/9042
(Continued)

(56) References Cited

U.S. PATENT DOCUMENTS 4,322,843 A * 3/1982 Beuscher ........... H04Q 11/0407
370/371
7,606,776 B1   10/2009 Havens et al.
(Continued)

FOREIGN PATENT DOCUMENTS

| JP | 2008123022 A | 5/2008 |
| JP | 2014518484 A | 7/2014 |
| JP | 20166555 A | 1/2016 |

OTHER PUBLICATIONS

David Gibson et al. Modeling Deterministic Spacecraft Networks, Space technology center. (Year: 2013).*
(Continued)

*Primary Examiner* — Omar J Ghowrwal
*Assistant Examiner* — Kokou R Detse

(57) ABSTRACT

A time slot designing device capable of outputting a correction location and a correction reason of a constraint relating to a slot allocation result that satisfies a corrected constraint is provided. A slot designing device 10 includes an output means 11 for outputting a correction constraint being a constraint as a correction target included in a constraint group relating to a constraint satisfaction problem from which a satisfiable solution is not derived, and a correction reason being a reason why the correction constraint is corrected; and a derivation means 12 for deriving a satisfiable solution of a constraint satisfaction problem generated based on the constraint group in which the output correction constraint is corrected. The derivation means 12 outputs information indicating the correction constraint and the correction reason that are output up until the satisfiable solution is derived.

6 Claims, 26 Drawing Sheets

(58) Field of Classification Search
USPC .......................................................... 370/392
See application file for complete search history.

(56) References Cited

U.S. PATENT DOCUMENTS

| | | | |
|---|---|---|---|
| 2010/0238932 A1* | 9/2010 | Kliger | H04L 12/4633 |
| | | | 370/392 |
| 2010/0318483 A1 | 12/2010 | Bagley et al. | |
| 2014/0362861 A1 | 12/2014 | Norridge et al. | |
| 2017/0211372 A1* | 7/2017 | Samuel | E21B 44/00 |

OTHER PUBLICATIONS

"Space Engineering", SpaceWire-Links, nodes, routers, and networks, ECSS-E-ST-50-12C, European Cooperation for Space Standardization (ECSS), ESA Requirements and Standard Division, Jul. 31, 2008, Noordwijk, The Netherlands (pp. 1-129).

Mencia, et al., "Efficient Relaxations of Over-Constrained CSPs", Tools with Artificial Intelligence (ICTAI), IEEE 26th International Conference on, IEEE, IEEE Computer Society, 2014 (pp. 725-732).

Gibson, et al., "Modeling Deterministic Spacecraft Networks with Constraint Programming", CP Doctoral Program 2013:49 (pp. 49-54).

Parkes, et al., "SpaceWire-D: Deterministic Data Delivery with SpaceWire", Proceedings of International SpaceWire Conference 2010, Feb. 2010 (9 pages).

Takada et al., "Development of Software Platform supporting a protocol for guaranteeing the real-time property of SpaceWire", Proceedings of the 57th Space Sciences and Technology Conference, Oct. 9, 2013 (6 pages).

English Translation of Written Opinion and the International Search Report of PCT/JP2017/014688 dated Jun. 27, 2017.

\* cited by examiner

Fig. 3

| COMMUNI-CATION REQUEST ID | PROTO-COL | TRANSMI-SSION SOURCE | TRANSMISSION DESTINATION | PATH ADDRESS | COMMAND | REPLY | REPLY PATH ADDRESS | DATA SIZE (byte) | COMMUNI-CATION INTERVAL (TIME SLOT NUMBER) |
|---|---|---|---|---|---|---|---|---|---|
| 1 | RMAP | SYSTEM CONTROL COMPONENT 201 | OBSERVATION-SYSTEM CONTROL COMPONENT 205 | 2-4 | RMAP-Write | PRESENT | 3-1 | 100 | 2 |
| 2 | RMAP | SYSTEM CONTROL COMPONENT 201 | OBSERVATION-SYSTEM CONTROL COMPONENT 205 | 2-4 | RMAP-Read | PRESENT | 3-1 | 100 | 2 |
| 3 | RMAP | SYSTEM CONTROL COMPONENT 201 | POSTURE-SYSTEM CONTROL COMPONENT 204 | 5-6 | RMAP-Read | PRESENT | 5-6 | 100 | 64 |
| ... | ... | ... | ... | ... | ... | ... | ... | ... | ... |

Fig. 4

| COMPONENT NAME | PORT | MAXIMUM DELAY TIME (SEC) |
|---|---|---|
| SYSTEM CONTROL COMPONENT 201 | 1 | 10 |
| ROUTER 206A | 2,5,11,12 | 10 |
| POSTURE-SYSTEM CONTROL COMPONENT 204 | 14,15 | 15 |
| ... | ... | ... |

Fig. 5

| LINK ID | CONNECTION SOURCE COMPONENT NAME | CONNECTION SOURCE PORT | CONNECTION DESTINATION COMPONENT NAME | CONNECTION DESTINATION PORT | COMMUNICATION CAPACITY (Mbit/SEC) |
|---|---|---|---|---|---|
| 1 | SYSTEM CONTROL COMPONENT 201 | 1 | ROUTER 206A | 12 | 1 |
| 2 | ROUTER 206B | 6 | POSTURE-SYSTEM CONTROL COMPONENT 204 | 14 | 1 |
| ... | ... | ... | ... | ... | ... |

Fig. 8

| VARIABLE NAME | VALUE OF VARIABLE |
|---|---|
| SLOT 0; PACKET 1 | 1 |
| SLOT 0; PACKET 2 | 0 |
| SLOT 0; PACKET 3 | 0 |
| SLOT 1; PACKET 1 | 0 |
| SLOT 1; PACKET 2 | 1 |
| SLOT 1; PACKET 3 | 0 |
| ... | ... |

Fig. 9

| CORRECTION COMMUNICATION CONSTRAINT ID | CORRECTION COMMENT |
|---|---|
| 1 | DELETED BECAUSE OF CAPACITY EXCESS OF LINK ID=1 |
| ... | ... |

Fig. 10

| COMMUNICATION REQUEST ID | TIME SLOT |
|---|---|
| 1 | 0,2,4,6,8,... |
| 2 | 1,3,5,7,9,... |
| ... | ... |

Fig. 17

| SLOT LIMIT ID | ALLOWABLE TIME SLOT | RMAP ADDRESS | COMMAND | REPLY |
|---|---|---|---|---|
| 1 | 0,4,8,16 | 00000 | RMAP-Write | PRESENT |
| 2 | 1,5,9,17 | 00005 | RMAP-Write | NOT PRESENT |
| 3 | 0,4,8,16 | 00001 | RMAP-Read | — |
| ... | ... | ... | ... | ... |

Fig. 18

| DEPENDENCY RELATION-SHIP ID | PREFEREN-TIAL RMAP ADDRESS | PREFEREN-TIAL COMMAND | PREFEREN-TIAL REPLY | SUBORDI-NATE RMAP ADDRESS | SUBORDI-NATE COMMAND | SUBORDI-NATE REPLY | TIME SLOT INTERVAL |
|---|---|---|---|---|---|---|---|
| 1 | 00010 | RMAP-Write | PRESENT | 00011 | RMAP-Write | PRESENT | 4 |
| 2 | 00020 | RMAP-Read | PRESENT | 00021 | RMAP-Read | PRESENT | * |
| ... | ... | ... | ... | ... | ... | ... | ... |

TIME SLOT DESIGNING DEVICE, TIME SLOT DESIGNING METHOD, AND RECORDING MEDIUM HAVING TIME SLOT DESIGNING PROGRAM STORED THEREON

This application is a National Stage Entry of PCT/JP2017/014688 filed on Apr. 10, 2017, which claims priority from Japanese Patent Application 2016-079520 filed on Apr. 12, 2016, the contents of all of which are incorporated herein by reference, in their entirety.

TECHNICAL FIELD

The present invention relates to a time slot designing device and the like for designing a transmission timing of a packet in a communication network.

BACKGROUND ART

There is SpaceWire™, as a standard specification of an interface of data communication, and a protocol of data communication to be performed between components mounted in an artificial satellite such as a commercial satellite, a scientific satellite, or an interplanetary space probe. NPL 1 describes a content of SpaceWire™.

A component employing SpaceWire™ is, after being used in an artificial satellite, re-used in a satellite whose mission is different, such as an observation purpose. Specifically, when a component compatible with SpaceWire™ is used, since an artificial satellite for another mission is developed, for example, by merely changing a setting content of a component other than an already developed component of an artificial satellite, a development period of developing a satellite is shortened.

However, SpaceWire™ is a specification in which a degree of freedom in network designing of a component increases, when being applied to a component. Since the number of checking operations increases when a degree of freedom in network designing is high, the number of works in a network test increases when an operation test of a component is performed.

For example, it is assumed that an integration test of communication is performed. Before an integration test is performed, a route within a network, and a schedule of a transmission timing of a packet relating to each control component are designed. A packet is transmitted in accordance with the designed schedule of a transmission timing.

When a design error is present in a designed schedule of a transmission timing, for example, another packet using a same route as a route used by a packet that is transmitted at first may collide with a reply packet and the like of the packet that is transmitted at first. Occurrence of collision may cause a transmission failure of a packet or a packet delay.

As described above, since a degree of freedom in network designing increases when SpaceWire™ is employed, labor for selecting an ideal network design from among many designing alternatives increases. Specifically, when SpaceWire™ is employed, there is a possibility that reworking of a test due to a designing error and the like on a schedule of a transmission timing may increase in an integration test of communication.

In the following description, a network constituted of components including an interface compatible with a SpaceWire specification is referred to as a SpaceWire network. Components constituting a SpaceWire network include various types of components to be mounted in an artificial satellite. Various types of components to be mounted in an artificial satellite are satellite-mounted components such as a power supply component, an observation component, and a posture component.

Further, components constituting a SpaceWire™ network also include a communication component for communicating with an earth station, and a system control component for controlling an overall system within a satellite. A system control component controls each component constituting a SpaceWire™ network by using a network management function defined in conformity with a SpaceWire™ specification.

In the following, a SpaceWire™ network is described with reference to a drawing. FIG. 25 is a block diagram illustrating a configuration example of a SpaceWire™ network 200. Note that the SpaceWire™ network 200 is described, based on a premise that an apparatus using the SpaceWire™ network 200 illustrated in FIG. 25 is an artificial satellite.

The SpaceWire™ network 200 includes a system control component 201, a communication component 202, a power supply component 203, a posture-system control component 204, an observation-system control component 205, routers 206A to 206E, posture control components 214A to 214B, and observation components 215A to 215X. Note that the number of each component illustrated in FIG. 25 is an example. The SpaceWire™ network 200 may include only one for each component, or may include components of a number other than the number illustrated in FIG. 25 for each component.

As described above, the system control component 201 has a function of controlling each of components constituting the SpaceWire™ network 200 by using a network management function defined in conformity with a SpaceWire™ specification. The system control component 201 controls each of the components by using a command, for example.

The communication component 202 has a function of performing predetermined communication with an earth station (not illustrated) or another artificial satellite (not illustrated). The power supply component 203 has a function of supplying electric power to each of the components constituting the SpaceWire™ network 200. The router 206A communicatively connects the system control component 201, the communication component 202, and the power supply component 203.

The posture-system control component 204 has a function of controlling a posture of an artificial satellite by controlling the posture control components 214A to 214B. The posture control component 214A has a function of changing a posture of an artificial satellite with respect to a predetermined orientation, for example. Further, the posture control component 214B has a function of changing a posture of an artificial satellite with respect to a rotational direction, for example.

As illustrated in FIG. 25, a posture system is constituted of the posture-system control component 204, the posture control component 214A, and the posture control component 214B. The router 206D communicatively connects the posture-system control component 204, the posture control component 214A, and the posture control component 214B.

The observation-system control component 205 has a function of performing various types of observation by controlling the observation components 215A to 215X. The observation components 215A to 215X each have a function of performing observation on set contents.

As illustrated in FIG. 25, an observation system is constituted of the observation-system control component 205, and the observation components 215A to 215X. The router 206E communicatively connects the observation-system control component 205, and the observation components 215A to 215X.

The router 206B communicatively connects the router 206A and the posture system. Further, the router 206C communicatively connects the router 206A, the router 206B, the posture system, and the observation system.

In communication in conformity with a SpaceWire™ specification, a source routing method in which a packet with information indicating an address of each component being written in a packet header is transmitted and received is mainly used. Communication employing a source routing method is referred to as path addressing communication.

In path addressing communication, in addition to an address of a component at a start point and an address of a component at an end point, an address of a component for relaying a packet is also designated. Note that a component at a start point is a component to be used by a transmission source or a sender in packet transmission. Further, a component at an end point is a component to be used by a transmission destination or a recipient in packet reception.

Note that an address to be designated by path addressing communication is information indicating a location in a communication network. A location in a communication network is designated by a port number, for example. Specifically, since a location via which a packet is transmitted in a communication network is designated, when path addressing communication is performed, a routing table for use in, for example, transmission control protocol/internet protocol (TCP/IP) is not necessary.

Hereinafter, an address for use in path addressing communication is referred to as a path address. In path addressing communication, a route change is performed by changing a path address written in a packet header.

In the following, path addressing communication is described with reference to a drawing. FIG. 26 is an explanatory diagram illustrating an example of path addressing communication. A system illustrated in FIG. 26 includes mounted components 210A to 210B, and routers 206X to 206Y. Specifically, the system illustrated in FIG. 26 includes two mounted components and two routers. Further, the mounted component 210A illustrated in FIG. 26 is communicatively connected to the mounted component 210B via the two routers.

The router 206X illustrated in FIG. 26 includes a port which is connected to the mounted component 210A and whose path address is "1", and a port which is connected to the router 206Y and whose path address is "2". Further, the router 206Y illustrated in FIG. 26 includes a port which is connected to the router 206X and whose path address is "3", and a port which is connected to the mounted component 210B and whose path address is "4".

Hereinafter, a port whose path address is "1" is referred to as a port 1, a port whose path address is "2" is referred to as a port 2, a port whose path address is "3" is referred to as a port 3, and a port whose path address is "4" is referred to as a port 4, respectively.

When a packet is transmitted to another mounted component, each mounted component writes, in a packet header of the packet to be transmitted, a path address being address information allocated to each port within a relay component (specifically, the router 206X and the router 206Y) through which the packet passes.

Further, a relay component (specifically, the router 206X and the router 206Y) that receives a packet transmits the packet from a port associated with a leading path address written in the packet header, to a next component.

However, before a packet is transmitted from a target port, each router deletes a leading path address written in a packet header being a path address of the target port. Specifically, in path addressing communication, a leading path address written in a packet header is deleted, each time a packet passes through a router.

For example, when the mounted component 210A illustrated in FIG. 26 transmits a packet to the mounted component 210B, the mounted component 210A writes, in a packet header of the packet to be transmitted, [2-4] as a path address. The path address [2-4] written in the packet header indicates that the packet to be transmitted passes through a port whose path address is "2", and a port whose path address is "4" in this order.

Specifically, a path address [p-q] written in a packet header indicates that "p" is a leading path address, and "q" is a trailing path address, respectively.

Note that the number of path addresses to be written in a packet header is not limited to two.

For example, when three path addresses are written, the path addresses are written in a form of "p-q-r" in a packet header. The path address "p-q-r" indicates that "p" is a leading path address, "q" is an intermediate path address, and "r" is a trailing path address, respectively.

An operation of a system when the mounted component 210A transmits a packet to the mounted component 210B is described more specifically. First of all, the mounted component 210A writes, in a packet header, [2-4] as a path address. Subsequently, the mounted component 210A transmits a packet to the router 206X.

When a packet is transmitted to the router 206X, the mounted component 210A may not designate a port of the router 206X as a transmission destination. A reason for this is that, since the mounted component 210A is connected only to a port 1 of the router 206X, as illustrated in FIG. 26, a transmitted packet always arrives at the port 1 of the router 206X.

Subsequently, the router 206X transmits the packet from a port associated with a leading path address written in the packet header of the received packet. Since [2-4] is written in the packet header as a path address, a port associated with the leading path address is a port 2.

However, when a packet is transmitted, the router 206X deletes a leading path address (specifically, the path address "2") written in the packet header. When the leading path address is deleted, the path address written in the packet header becomes [4].

Specifically, when a packet is transmitted, the router 206X deletes the path address "2" being a leading path address written in a packet header, and transmits the packet from the port 2 being a port associated with the deleted path address.

The port 2 of the router 206X is connected to a port 3 of the router 206Y. Therefore, a packet transmitted from the router 206X is received by the router 206Y. Then, the router 206Y transmits the packet from a port associated with a leading path address written in a packet header of the received packet. Since [4] is written in the packet header as a path address, a port associated with the leading path address is a port 4.

However, when a packet is transmitted, the router 206Y deletes a leading path address (specifically, the path address "4") written in the packet header. When the leading path address is deleted, the path address written in the packet header becomes empty (empty set).

Specifically, when a packet is transmitted, the router 206Y deletes the path address "4" being a leading path address written in a packet header, and transmits the packet from the port 4 being a port associated with the deleted path address.

The port 4 of the router 206Y is connected to the mounted component 210B. Therefore, a packet transmitted from the router 206X, whose path address is empty, is received by the mounted component 210B. The mounted component 210B determines the packet whose path address is empty as a packet which does not need to be transferred, specifically, a packet addressed to the own component. As described above, the mounted component 210B receives a packet addressed to the own component.

As described above, the mounted component 210A is able to transmit a packet to the mounted component 210B by writing, in a packet header, a path address of a transmission port of a router via which the packet arrives at the mounted component 210B being a transmission destination of the packet. Likewise, when a packet is transmitted to the mounted component 210A, as illustrated in FIG. 26, the mounted component 210B is only required to write a path address [3-1] in a packet header of the packet as a transmission target.

Further, in SpaceWire™, a time interval of 15.625 ms, which is called a time slot, is defined. Specifically, sixty-four time slots correspond to one second.

SpaceWire™ employs a method of controlling a transmission timing in such a way that a packet is transmitted at a predetermined period or a predetermined timing by allocating the packet as a communication target to a predetermined time slot. Note that a predetermined period is one second, for example. A method of controlling a transmission timing by using a time slot defined by SpaceWire™ is described in NPL 2.

A control component compatible with a SpaceWire™ specification holds a list of time slots to which a packet to be transmitted is allocated. The control component performs communication of transmitting and receiving a packet between components in accordance with the held list of time slots.

Further, NPL 3 describes a scheduling tool for use in a SpaceWire™ network (particularly, in an intra-satellite network). The scheduling tool described in NPL 3 calculates a path address of a location via which a packet is transmitted from a component as a transmission source to a component as a transmission destination by using topology information and communication request information of a SpaceWire™ network.

Further, the scheduling tool described in NPL 3 allocates a packet to a time slot for use in communication of a packet. Note that a format of topology information and a format of communication request information described in NPL 3 are an extensible markup language (XML) format.

Further, NPL 4 describes a method of performing scheduling of an intra-satellite network by using a constraint program. The method described in NPL 4 formulates all constraints on information indicating connection between components within a SpaceWire™ network, an upper limit of a use rate of a bandwidth in each time slot, and the like.

By formulating constraints, the method described in NPL 4 converts route calculation and time slot allocation to a solution of a constraint satisfaction problem. The method described in NPL 4 solves a converted constraint satisfaction problem, and performs scheduling of an intra-satellite network by using a derived satisfiable solution.

Further, a constraint satisfiable solution is searched by an existing constraint satisfaction solver, for example. When a searched constraint satisfiable solution is analyzed, information on a node through which a packet requested to be transmitted passes, and time slot allocation information are acquired.

Further, NPL 5 describes a method of searching a satisfiable solution by alleviating a too severe constraint. Generally, there is a case that a satisfiable solution is not present in a constraint satisfaction problem. In the method described in NPL 5, when a satisfiable solution is not present in a constraint satisfaction problem, a partial constraint group in which a contradiction is present is extracted from all constraint groups, and a selected constraint is appropriately deleted from all the constraint groups in such a way as to eliminate the contradiction. When the selected constraint is appropriately deleted, the original constraint satisfaction problem is corrected, and a satisfiable solution is acquired.

A partial constraint group which is included in original all constraint groups and in which a contradiction is present is referred to as an unsatisfiable core (hereinafter, referred to as an Unsat Core™). NPL 5 describes an algorithm for calculating an Unsat Core™ in which a constraint as a deletion target for eliminating a contradiction becomes one, at a high speed.

CITATION LIST

Non Patent Literature

[NPL 1] SpaceWire™ Standard ECSS-E-ST-50-12C (European Cooperation for Space Standardization (ECSS)), Jul. 21, 2008.
[NPL 2] Steve Parkes, Albert Ferrer, Stuart Mills, and Alex Mason, "SpaceWire-D: Deterministic Data Delivery with SpaceWire™", Proceedings of International SpaceWire™ Conference 2010, February 2010.
[NPL 3] Mitsutaka TAKADA, Hiroaki TAKADA, Takayuki YUASA et al., "Development of Software Platform for Guaranteeing the Real-Time Property of SpaceWire™", Proceedings of the 57th Space Sciences and Technology Conference, pp. 6, Oct. 9, 2013.
[NPL 4] Gibson, David, Steve Parkes, and Karen Petrie, "Modeling Deterministic Spacecraft Networks with Constraint Programming", CP Doctoral Program 2013: 49.
[NPL 5] Mencia, Carlos, and Joao Marques-Silva, "Efficient Relaxations of Over-constrained CSPs", Tools with Artificial Intelligence (ICTAI), 2014 IEEE 26th International Conference on, IEEE, 2014.

SUMMARY OF INVENTION

Technical Problem

In the scheduling tool described in NPL 3, a time slot is allocated by solving an optimization problem by using an annealing method. However, when a time slot is allocated by solving an optimization problem, the scheduling tool may also calculate a slot allocation result that does not satisfy a constraint.

Further, even when the scheduling tool described in NPL 3 calculates a slot allocation result that does not satisfy a constraint, a user of the scheduling tool may not grasp, from a result content, that the calculated slot allocation result does not satisfy a constraint.

NPLs 1 and 2 describe a SpaceWire™ specification. However, NPLs 1 and 2 do not describe a solving method of the above-described problem, which may occur when the scheduling tool described in NPL 3 is used at a designing stage.

Further, in the method described in NPL 4, since time slot allocation is performed by executing a constraint program, it is possible to calculate a slot allocation result that satisfies a constraint. Specifically, when the method described in NPL 4 is employed, the above-described problem in the scheduling tool described in NPL 3 is solved.

However, when a constraint satisfiable solution is not present, a slot allocation result is not calculated. Further, when the method described in NPL 4 is employed, a designer may not know a reason why a slot allocation result is not calculated.

When a constraint satisfiable solution is not present, a designer reviews a design content on a communication request, and performs time slot allocation again. However, when reviewing a design content on a communication request, the designer may not know which item of the design content on a communication request needs to be corrected in order to acquire a satisfiable solution, even by referring to an output result by the method described in NPL 4.

The method described in NPL 5 is capable of presenting a designer with a constraint candidate for which correction is required, by calculating an Unsat Core™. Specifically, when the method described in NPL 5 is employed, the above-described problem in the method described in NPL 4 is solved. However, the method described in NPL 5 fails to select a constraint as a correction target, or to present a reason why the constraint as a correction target is selected.

Further, a content to be presented as a selected correction location and a correction reason depends on a content of a constraint that requires consideration when time slot allocation is performed. However, NPL 5 does not describe a content of a constraint to be considered when time slot allocation is performed. In order to present a specific correction location and a specific correction reason, a content of a constraint to be considered when time slot allocation is performed is required to be specific.

In view of the above, an object of the present invention is to provide a time slot designing device, a time slot designing method, and a time slot designing program that solve the above-described problems, and are capable of outputting a correction location and a correction reason of a constraint relating to a slot allocation result that satisfies a corrected constraint.

Solution to Problem

An aspect of a time slot designing device according to the present invention includes: an output means for outputting a correction constraint being a constraint as a correction target included in a constraint group relating to a constraint satisfaction problem from which a satisfiable solution is not derived, and a correction reason being a reason why the correction constraint is corrected; and a derivation means for deriving a satisfiable solution of a constraint satisfaction problem generated based on the constraint group in which the output correction constraint is corrected. The derivation means outputs information indicating the correction constraint and the correction reason that are output up until the satisfiable solution is derived.

An aspect of a time slot designing method according to the present invention includes: outputting a correction constraint being a constraint as a correction target included in a constraint group relating to a constraint satisfaction problem from which a satisfiable solution is not derived, and a correction reason being a reason why the correction constraint is corrected; deriving a satisfiable solution of a constraint satisfaction problem generated based on the constraint group in which the output correction constraint is corrected; and outputting information indicating the correction constraint and the correction reason that are output up until the satisfiable solution is derived.

An aspect of a time slot designing program stored on a storage medium according to the present invention causes a computer to execute: output processing of outputting a correction constraint being a constraint as a correction target included in a constraint group relating to a constraint satisfaction problem from which a satisfiable solution is not derived, and a correction reason being a reason why the correction constraint is corrected; derivation processing of deriving a satisfiable solution of a constraint satisfaction problem generated based on the constraint group in which the output correction constraint is corrected; and information output processing of outputting information indicating the correction constraint and the correction reason that are output up until the satisfiable solution is derived.

Advantageous Effects of Invention

According to the present invention, it is possible to output a correction location and a correction reason of a constraint relating to a slot allocation result that satisfies a corrected constraint.

BRIEF DESCRIPTION OF DRAWINGS

FIG. 3 is an explanatory diagram illustrating an example of a communication request information list.

FIG. 4 is an explanatory diagram illustrating an example of a path address information list included in topology information.

FIG. 5 is an explanatory diagram illustrating an example of a connection information list included in topology information.

FIG. 8 is an explanatory diagram illustrating an example of satisfiable solution information.

FIG. 9 is an explanatory diagram illustrating an example of correction location information.

FIG. 10 is an explanatory diagram illustrating an example of schedule result information.

FIG. 17 is an explanatory diagram illustrating an example of a slot limit definition information list.

FIG. 18 is an explanatory diagram illustrating an example of a dependency relationship definition information list.

EXAMPLE EMBODIMENT

In the following, example embodiments of the present invention are described with reference to the drawings. Each of the drawings illustrates an example embodiment of the present invention. Note that an example embodiment of the present invention is not limited to a content illustrated in each drawing. Further, a same reference number is provided for a same constituent element illustrated in each drawing.

First Example Embodiment

[Description on Configuration]

Figure 1:
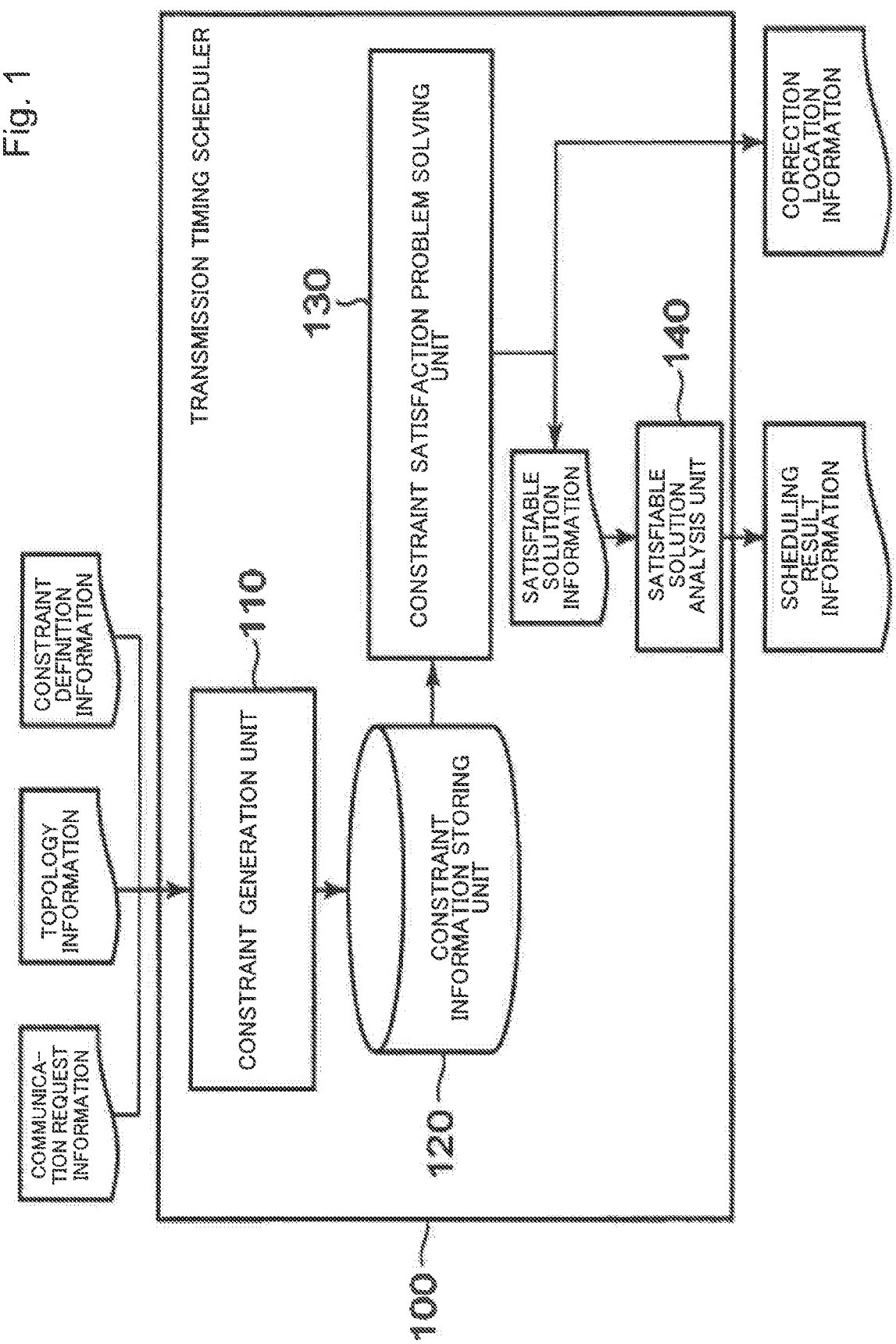
FIG. 1 is a block diagram illustrating a configuration example of a transmission timing scheduler 100 in a first example embodiment according to the present invention.

Next, a first example embodiment of the present invention is described with reference to the drawings. FIG. 1 is a block diagram illustrating a configuration example of a transmission timing scheduler 100 in the first example embodiment according to the present invention.

The transmission timing scheduler 100 in the present example embodiment generates schedule information whose use prevents occurrence of a human error and enables performance of highly reliable communication. Further, when the transmission timing scheduler 100 in the present example embodiment is used, a designer is able to speedily review a design content on a communication request.

The transmission timing scheduler 100 illustrated in FIG. 1 generates a design content relating to a device within a communication network. Specifically, the transmission timing scheduler 100 generates a time slot table indicating a schedule of a packet transmission timing to be used in a SpaceWire™ network 200 and the like illustrated in FIG. 25. Further, the transmission timing scheduler 100 in the present example embodiment also presents a correction location within a constraint group together with a time slot table.

As illustrated in FIG. 1, the transmission timing scheduler 100 in the present example embodiment includes a constraint generation unit 110, a constraint information storing unit 120, a constraint satisfaction problem solving unit 130, and a satisfiable solution analysis unit 140.

Further, as illustrated in FIG. 1, communication request information, topology information, and constraint definition information are input to the transmission timing scheduler 100. Note that constraint definition information may not be necessarily input.

Note that a means for inputting communication request information, topology information, and constraint definition information to the transmission timing scheduler 100 may be any means. For example, a user of the transmission timing scheduler 100 may input each piece of information to an input device (not illustrated), and the input device may transmit the input piece of information to the transmission timing scheduler 100. Alternatively, a user may directly operate the transmission timing scheduler 100, and input each piece of information.

As illustrated in FIG. 1, the constraint generation unit 110 of the transmission timing scheduler 100 has a function of generating supplementary-information-appended constraint information. The constraint generation unit 110 stores generated supplementary-information-appended constraint information in the constraint information storing unit 120.

Further, as illustrated in FIG. 1, the constraint satisfaction problem solving unit 130 has a function of generating satisfiable solution information and correction location information, based on supplementary-information-appended constraint information stored in the constraint information storing unit 120. The constraint satisfaction problem solving unit 130 inputs generated satisfiable solution information to the satisfiable solution analysis unit 140.

Further, as illustrated in FIG. 1, the satisfiable solution analysis unit 140 generates scheduling result information by using input satisfiable solution information. Scheduling result information indicates a time slot allocation result. Finally, the transmission timing scheduler 100 outputs scheduling result information and correction location information.

When output scheduling result information is appropriately input, a satellite control component is operated in accordance with a time slot allocation result indicated by the input information. Further, correction location information indicates a correction location, and a correction comment including a correction reason with respect to the correction location.

Specifically, a user of the transmission timing scheduler 100 is able to correct input communication request information by referring to output correction location information. The user is able to cause the transmission timing scheduler 100 to re-execute time slot allocation by using corrected communication request information.

In the following, each constituent element included in the transmission timing scheduler 100 is described with reference to a drawing. First of all, the constraint generation unit 110 is described.

Figure 2:
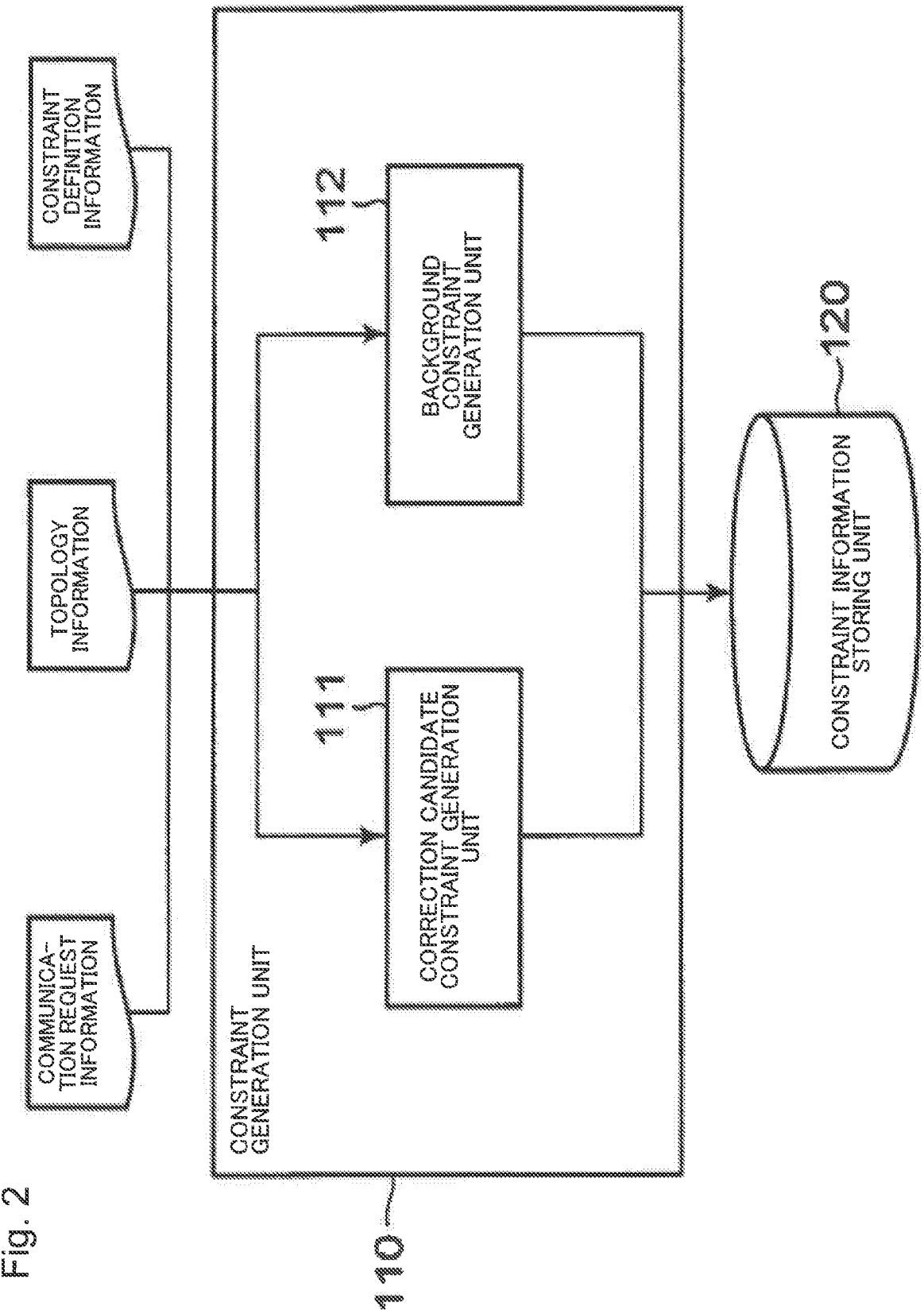
FIG. 2 is a block diagram illustrating a configuration example of a constraint generation unit 110.

FIG. 2 is a block diagram illustrating a configuration example of the constraint generation unit 110. As illustrated in FIG. 2, the constraint generation unit 110 in the present example embodiment includes a correction candidate constraint generation unit 111 and a background constraint generation unit 112.

As illustrated in FIG. 2, the correction candidate constraint generation unit 111 of the constraint generation unit 110 generates supplementary-information-appended constraint information including a constraint formula, a "correction candidate" tag, and a correction comment, based on communication request information and topology information. Specifically, supplementary-information-appended constraint information to be generated by the correction candidate constraint generation unit 111 indicates a correction candidate constraint. The correction candidate constraint generation unit 111 stores generated supplementary-information-appended constraint information in the constraint information storing unit 120.

Further, as illustrated in FIG. 2, the background constraint generation unit 112 of the constraint generation unit 110 generates supplementary-information-appended constraint information including a constraint formula, a "background" tag, and a correction reason comment, based on communication request information and topology information. Specifically, supplementary-information-appended constraint information to be generated by the background constraint generation unit 112 indicates a background constraint. The background constraint generation unit 112 stores generated supplementary-information-appended constraint information in the constraint information storing unit 120.

Note that the correction candidate constraint generation unit 111 and the background constraint generation unit 112 may generate supplementary-information-appended constraint information by using constraint definition information as well. In the present example embodiment, an example in which the correction candidate constraint generation unit 111 and the background constraint generation unit 112 generate supplementary-information-appended constraint information without using constraint definition information is described.

The correction candidate constraint generation unit 111 generates a correction candidate constraint in such a way that a satisfiable solution is always present in a constraint satisfaction problem in which only a constraint included in a correction candidate constraint group generated by the correction candidate constraint generation unit 111 is considered. Further, the background constraint generation unit 112 generates a background constraint in such a way that a satisfiable solution is always present in a constraint satisfaction problem in which only a constraint included in a background constraint group generated by the background constraint generation unit 112 is considered.

When a correction candidate constraint group and a background constraint group are generated as described above, and in a case where a satisfiable solution is not present in a constraint satisfaction problem in which all constraint groups are considered, both a constraint included in the correction candidate constraint group, and a constraint included in the background constraint group are always included in an Unsat Core™.

The transmission timing scheduler 100 in the present example embodiment performs selection of a constraint as a correction target and reasoning for correction with use of a background constraint, by using a property such that an Unsat Core™ always includes both a constraint included in a correction candidate constraint group, and a constraint included in a background constraint group. In a case where an Unsat Core™ includes only a constraint included in a correction candidate constraint group, the transmission timing scheduler 100 cannot perform reasoning for correction with respect to a constraint as a correction target, since a constraint included in a background constraint group is not present.

Further, when an Unsat Core™ includes only a constraint included in a background constraint group, it is obvious that the transmission timing scheduler 100 cannot correct a constraint group, since a constraint itself included in a correction candidate constraint group is not present. For the above-described reason, in order to perform selection of a constraint as a correction target and reasoning for correction, it is required that an Unsat Core™ includes both a constraint included in a correction candidate constraint group, and a constraint included in a background constraint group.

In the following, communication request information and topology information to be input to the constraint generation unit 110 are described. First of all, communication request information is described.

Communication request information is information indicating a content of a packet whose transmission is requested by a satellite control component included in a SpaceWire™ network. Communication request information indicates route information associated with communication as a test target, and specific information relating to communication such as a type of protocol and a data size for use in a test. Specifically, communication request information is generated in accordance with design intention of a network designer.

FIG. 3 is an explanatory diagram illustrating an example of a communication request information list. The communication request information list illustrated in FIG. 3 is constituted of a plurality of pieces of communication request information. Further, as illustrated in FIG. 3, communication request information is constituted of a communication request identifier (ID), a protocol, a transmission source, a transmission destination, a path address, a command, a reply, a reply path address, a data size, and a communication interval.

A communication request ID is an identifier for identifying communication request information. A protocol is a protocol for use in requested communication indicated by a communication request ID.

"RMAP" is written in the protocol illustrated in FIG. 3. A remote memory access protocol (RMAP) is a protocol in which a function for use when a component connected to a SpaceWire™ network reads and writes data is defined (e.g. see NPL 1). Further, an RMAP address is a memory address of a target component to be accessed by an RMAP. In NPL 1, a memory address to be accessed by a component as a communication destination is defined.

A transmission source indicates a name of a component being a transmission source (start point) of a packet, or an identifier of the component.

Further, a transmission destination indicates a name of a component being a transmission destination (end point) of a packet, or an identifier of the component.

Figure 26:
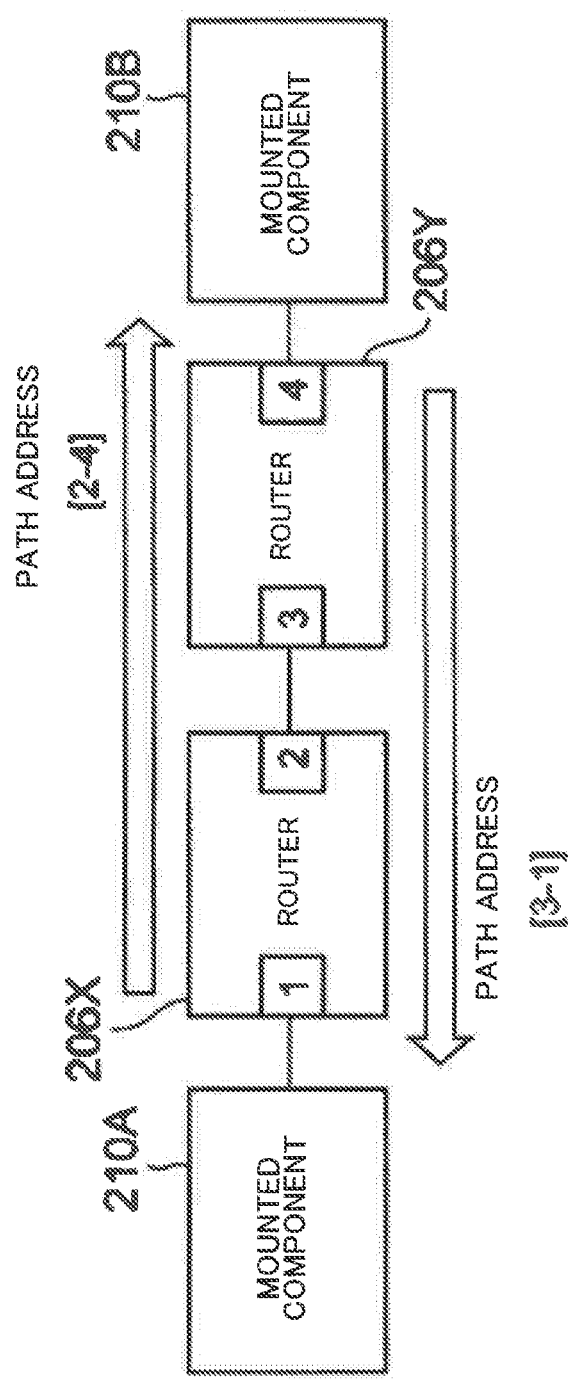
FIG. 26 is an explanatory diagram illustrating an example of path addressing communication.

A path address is an address for use in requested path addressing communication identified by a communication request ID. As described above, a path address is written in a packet header of a packet as a transmission target. Further, a format of a path address in the present example embodiment is similar to a format of a path address for use in the system illustrated in FIG. 26.

A command indicates a type of command included in a packet as a transmission target. As a type of command, a command name is indicated, for example. A reason why a command is included in communication request information in the present example embodiment is that the number of types of command is particularly large among types of information for use in a test. Note that communication request information may include information necessary for a test other than a command.

A reply (response) indicates presence or absence of a reply with respect to a transmitted packet. Further, a reply address is a path address used in communication of a reply packet.

A data size is a data size of a packet for use in requested communication identified by a communication request ID. A unit of a data size illustrated in FIG. 3 is byte. Note that a value in terms of a unit other than byte may be written as a data size.

A communication interval is an interval at which requested communication identified by a communication request ID is performed. A time slot number is written in the communication interval. For example, communication whose communication request ID is "1" is repeatedly performed at a time interval corresponding to two time slots.

Note that a format of communication request information is not limited to the format illustrated in FIG. 3. For example, a format of communication request information may be a command list format constituted of commands to be input and output to and from respective control components included in a SpaceWire™ network.

Next, topology information is described. Topology information includes information on a component included in a SpaceWire™ network such as a control unit, a router, a posture component, and an observation component; and connection (link) information being information relating to connection between components. Connection information is information indicating a port of a component to which a port of each component including a router is connected.

Note that topology information may include information, other than connection information, relating to a component included in a SpaceWire™ network. For example, topology information may include information indicating performance and a function of a component included in a SpaceWire™ network.

Topology information in the present example embodiment includes path address information relating to a path address, and connection information relating to connection. FIG. 4 is an explanatory diagram illustrating an example of a path address information list included in topology information. The path address information list illustrated in FIG. 4 is constituted of a plurality of pieces of path address information. Further, FIG. 5 is an explanatory diagram illustrating an example of a connection information list included in topology information. The connection information list illustrated in FIG. 5 is constituted of a plurality of pieces of connection information.

Figure 6:
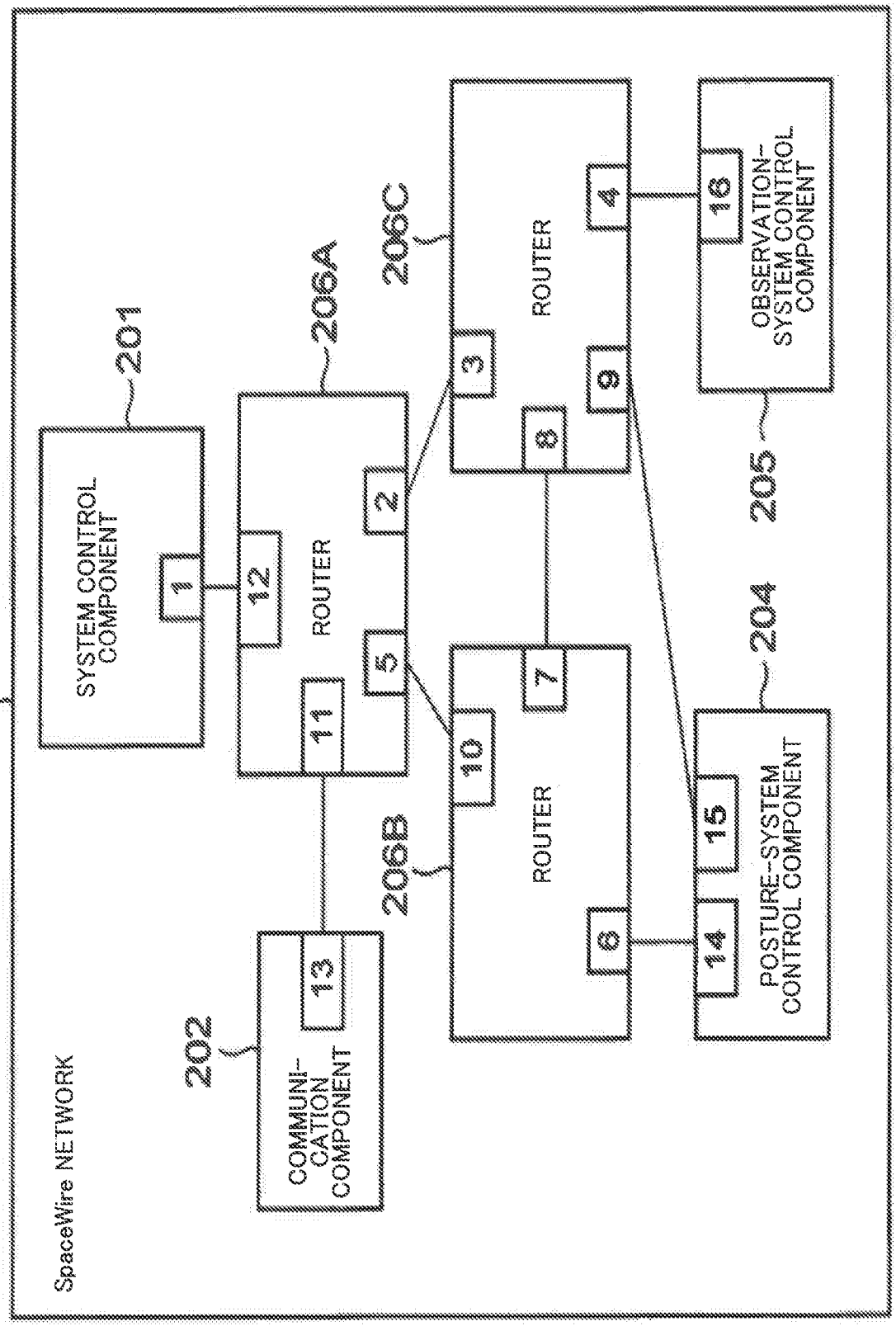
FIG. 6 is a block diagram illustrating a part of a configuration example of a SpaceWire network 200.

Note that the path address information illustrated in FIG. 4 and the connection information illustrated in FIG. 5 are information generated by using a port number (path address) of a port of each router included in a SpaceWire™ network 200 illustrated in FIG. 6. FIG. 6 is a block diagram illustrating a part of a configuration example of the SpaceWire™ network 200.

A line connecting a component and a router, and a line connecting routers illustrated in FIG. 6 indicate a link. Note that the SpaceWire™ network 200 also includes a link other than the links illustrated in FIG. 6.

Figure 25:
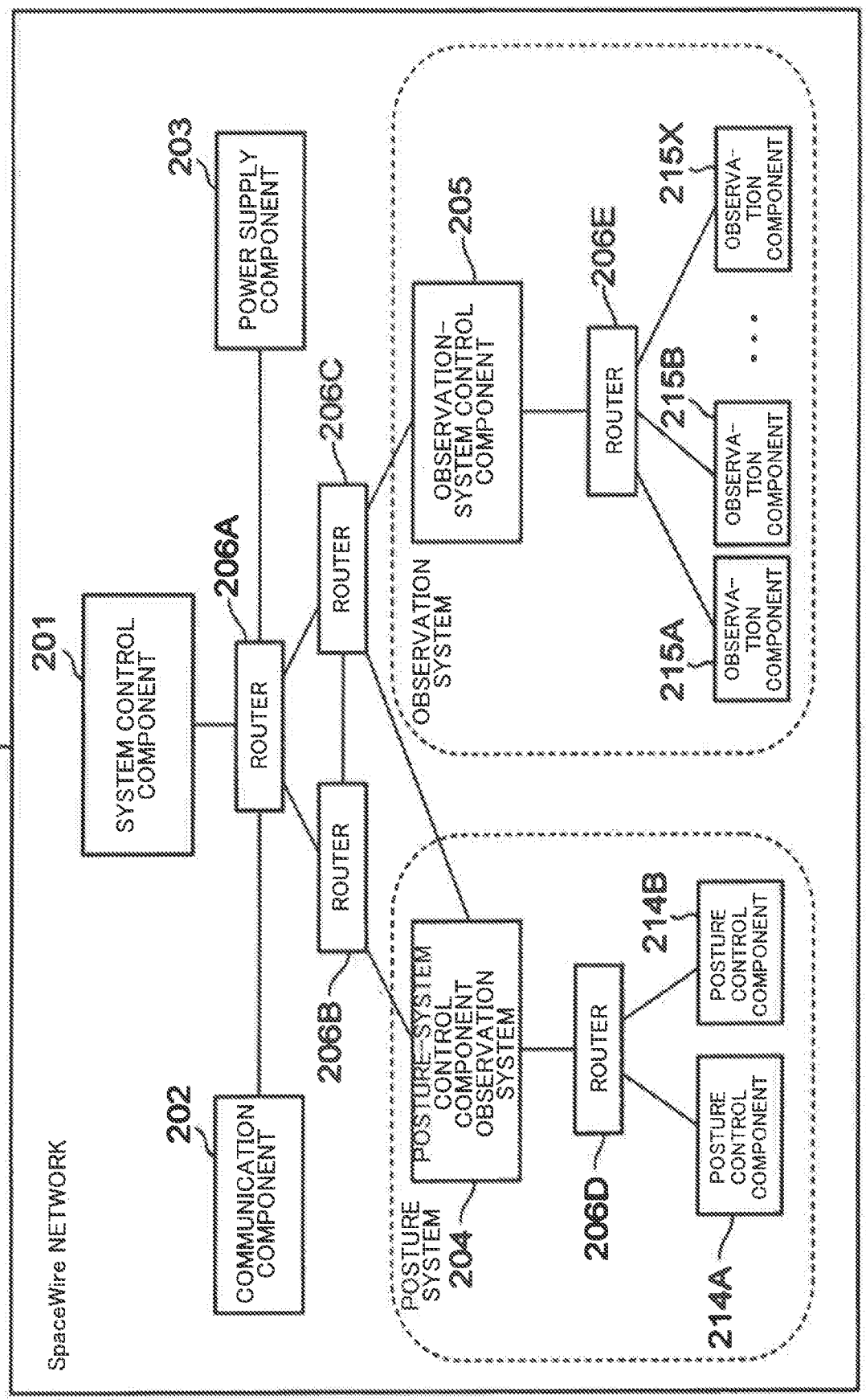
FIG. 25 is a block diagram illustrating a configuration example of a SpaceWire network 200.

Further, FIG. 6 illustrates path addresses of ports of the router 206A to the router 206C included in the SpaceWire™ network 200 illustrated in FIG. 25. Specifically, a rectangle within each router connected to each link illustrated in FIG. 6 indicates a port. Further, a number written in a rectangle within each router is a port number (path address). For example, a path address of a port of the router 206A connected to a port of a system control component 201 via a link is "12".

The path address information illustrated in FIG. 4 is constituted of a component name of each component, a port, and a maximum delay time. A component name is a name of a component included in the SpaceWire™ network 200. As a component name, a specific name may be written, or information capable of identifying a component such as an identifier may be written.

A port indicates a port number (path address) of a port for use as a route when a packet is transmitted to a component indicated by a component name. For example, when a packet is transmitted to the system control component 201, a port whose path address is "1" is used as a route.

A maximum delay time is a maximum time required for a packet to reach a component indicated by a component name via a port indicated by a path address. A unit of a maximum delay time illustrated in FIG. 4 is second. Note that a value in terms of a unit other than second may be written as a maximum delay time.

Further, the connection information illustrated in FIG. 5 is constituted of a link ID, a connection source component name, a connection source port, a connection destination component name, a connection destination port, and a communication capacity. A link ID is an identifier for identifying a link.

A connection source component name indicates a name of a component as a connection source to which a link indicated by a link ID is connected, or an ID of a component as a connection source. Further, a connection source port indicates a port number of a port connected to a link, of a component indicated by a connection source component name.

A connection destination component name indicates a name of a component as a connection destination to which a link indicated by a link ID is connected, or an ID of a component as a connection destination. Further, a connection destination port indicates a port number of a port connected to a link, of a component indicated by a connection destination component name.

Note that, in the connection information illustrated in FIG. 5, information indicated by a connection source component name and information indicated by a connection source port, and information indicated by a connection destination component name and information indicated by a connection destination port may be interchanged. For example, it is clear that, when connection information in which the link ID illustrated in FIG. 5 is "1" is referred to, both communication from the system control component 201 to the router 206A, and communication from the router 206A to the system control component 201 are performed via a link whose link ID is "1".

A communication capacity is a communication capacity of a link indicated by a link ID. As a value indicating a communication capacity, a value of a communication bandwidth is written, for example. A unit of a communication capacity illustrated in FIG. 5 is Mbit/sec. Note that a value in terms of a unit other than Mbit/sec may be written as a communication capacity.

Figure 7:
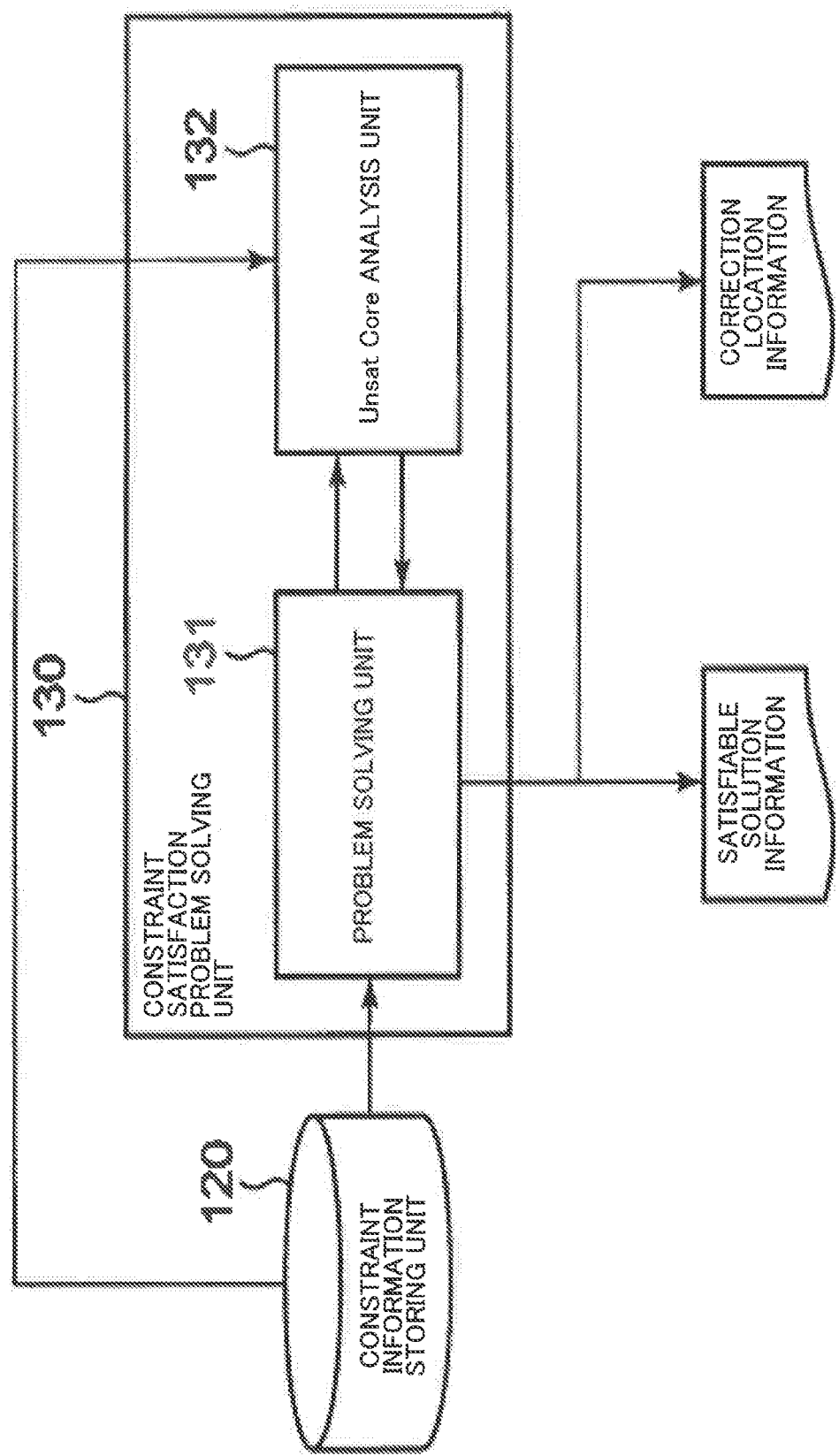
FIG. 7 is a block diagram illustrating a configuration example of a constraint satisfaction problem solving unit 130.

Next, the constraint satisfaction problem solving unit 130 is described. FIG. 7 is a block diagram illustrating a configuration example of the constraint satisfaction problem solving unit 130. As illustrated in FIG. 7, the constraint satisfaction problem solving unit 130 in the present example embodiment includes a problem solving unit 131 and an Unsat Core™ analysis unit 132.

The problem solving unit 131 of the constraint satisfaction problem solving unit 130 has a function of acquiring a satisfiable solution being a solution that satisfies all constraints indicated by information stored in the constraint information storing unit 120.

When a satisfiable solution is acquired by solving a constraint satisfaction problem, the problem solving unit 131 outputs satisfiable solution information including information indicating a value allocated to a variable when the satisfiable solution is derived, and correction location information including information indicating a constraint that is corrected up until the satisfiable solution is acquired and a correction comment.

When a satisfiable solution is not acquired by solving a constraint satisfaction problem, the problem solving unit 131 generates an Unsat Core™. Subsequently, the problem solving unit 131 inputs the generated Unsat Core™ to the Unsat Core™ analysis unit 132.

The Unsat Core™ analysis unit 132 has a function of analyzing an Unsat Core™ input by referring to supplementary-information-appended constraint information. The Unsat Core™ analysis unit 132 selects a constraint as a correction target from a constraint group indicated by supplementary-information-appended constraint information including a "correction candidate" tag, and generates a correction comment by using information in which an Unsat Core™ is analyzed.

Generally, one Unsat Core™ includes a part of a constraint in which a contradiction is present, among all constraints indicated by information stored in the constraint information storing unit 120. Specifically, the problem solving unit 131 may not acquire a satisfiable solution, even when a constraint as a correction target is eliminated from all constraints. The constraint satisfaction problem solving unit 130 repeatedly performs a search of a satisfiable solution by the problem solving unit 131, and derivation of a constraint as a correction target by the Unsat Core™ analysis unit 132 up until a satisfiable solution is acquired.

In the following, each of the constituent elements included in the constraint satisfaction problem solving unit 130 is specifically described with reference to FIG. 7. First of all, the problem solving unit 131 is described.

The problem solving unit 131 searches a satisfiable solution being a solution that satisfies all given constraint groups. A constraint group to be given to the problem solving unit 131 at first is a constraint group constituted of all constraints indicated by information stored in the constraint information storing unit 120.

A constraint group to be given to the problem solving unit 131 in a search of a satisfiable solution at a second time and thereafter is a constraint group constituted of all constraints, which is acquired by eliminating a constraint as a correction target input from the Unsat Core™ analysis unit 132, from a constraint group given at first. When a satisfiable solution is acquired by a search, the problem solving unit 131 outputs satisfiable solution information and correction location information.

Next, the Unsat Core™ analysis unit 132 is described. An Unsat Core™ is input to the Unsat Core™ analysis unit 132 from the problem solving unit 131. The Unsat Core™ analysis unit 132 classifies constraints included in the input Unsat Core™ into correction candidate constraints and background constraints. Subsequently, the Unsat Core™ analysis unit 132 selects a constraint as a correction target from among the classified correction candidate constraints, and inputs the selected constraint to the problem solving unit 131.

In the following, satisfiable solution information and correction location information to be output from the problem solving unit 131 are described. First of all, satisfiable solution information is described.

FIG. 8 is an explanatory diagram illustrating an example of satisfiable solution information. As illustrated in FIG. 8, satisfiable solution information is constituted of variable information indicating a variable. Further, the variable information is constituted of a variable name and a value of a variable.

A variable name in the present example embodiment is defined by a format of "slot n; packet m". Note that n is a time slot number, and m is a communication request ID relating to a packet, or a packet number. Further, a value of a variable in the present example embodiment is 0 or 1.

For example, when a value of a variable having a variable name "slot n; packet m" is 1, a time slot having a slot number n is allocated to a packet relating to a communication request whose communication request ID is m. Further, for example, when a value of a variable having a variable name "slot n; packet m" is 0, a time slot having a slot number n is not allocated to a packet relating to a communication request whose communication request ID is m.

Next, correction location information is described. FIG. 9 is an explanatory diagram illustrating an example of correction location information. As illustrated in FIG. 9, correction location information indicates a corrected constraint. Further, as illustrated in FIG. 9, correction location information is constituted of a correction communication constraint ID and a correction comment. A correction communication constraint ID is an identifier for identifying a corrected constraint.

Next, the satisfiable solution analysis unit 140 is described. The satisfiable solution analysis unit 140 has a function of generating schedule result information, based on input satisfiable solution information. FIG. 10 is an explanatory diagram illustrating an example of schedule result information.

As illustrated in FIG. 10, schedule result information is constituted of a communication request ID and a time slot. A communication request ID is information defined by communication request information. A time slot number allocated to a communication request ID is written in schedule result information.

The satisfiable solution analysis unit 140 acquires a time slot allocation result indicated by schedule result information by interpreting a value of a variable written in satisfiable solution information.

[Description on Operation]

Figure 11:
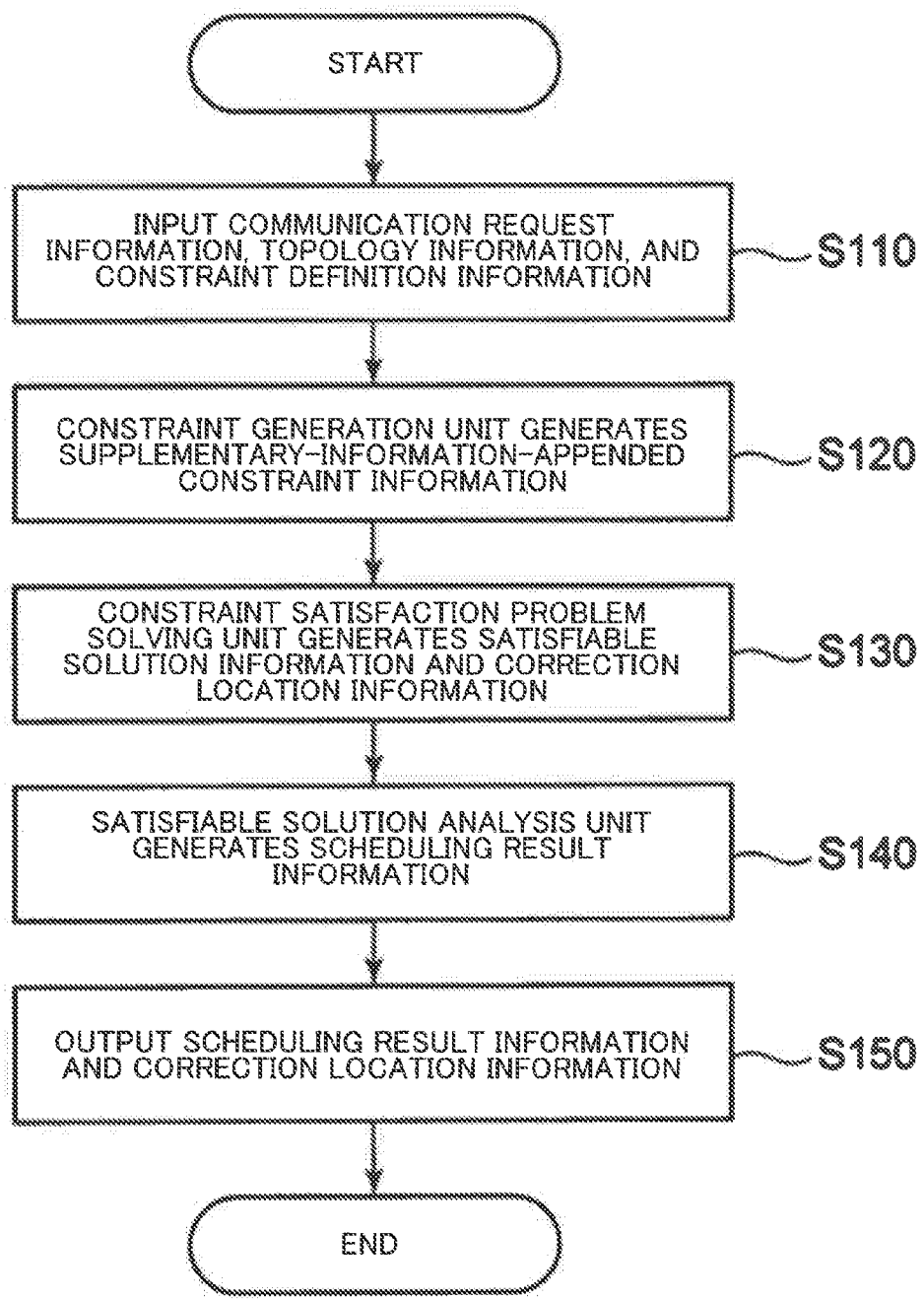
FIG. 11 is a flowchart illustrating an overall operation of design processing by the transmission timing scheduler 100 in the first example embodiment.

In the following, an operation of the transmission timing scheduler 100 in the present example embodiment is described with reference to FIG. 11 to FIG. 15. FIG. 11 is a flowchart illustrating an overall operation of design processing by the transmission timing scheduler 100 in the first example embodiment.

Communication request information and topology information are input to the transmission timing scheduler 100. Note that constraint definition information may be input to the transmission timing scheduler 100 (Step S110).

Subsequently, the constraint generation unit 110 generates supplementary-information-appended constraint information, based on the input communication request information and topology information (Step S120). The constraint generation unit 110 stores the generated supplementary-information-appended constraint information in the constraint information storing unit 120.

Subsequently, the constraint satisfaction problem solving unit 130 generates satisfiable solution information and correction location information by using information stored in the constraint information storing unit 120 (Step S130). The constraint satisfaction problem solving unit 130 inputs the generated satisfiable solution information to the satisfiable solution analysis unit 140.

Subsequently, the satisfiable solution analysis unit 140 generates scheduling result information, based on the input satisfiable solution information (Step S140). Subsequently, the transmission timing scheduler 100 outputs the generated scheduling result information and correction location information (Step S150). After the output, the transmission timing scheduler 100 finishes the design processing.

Figure 12:
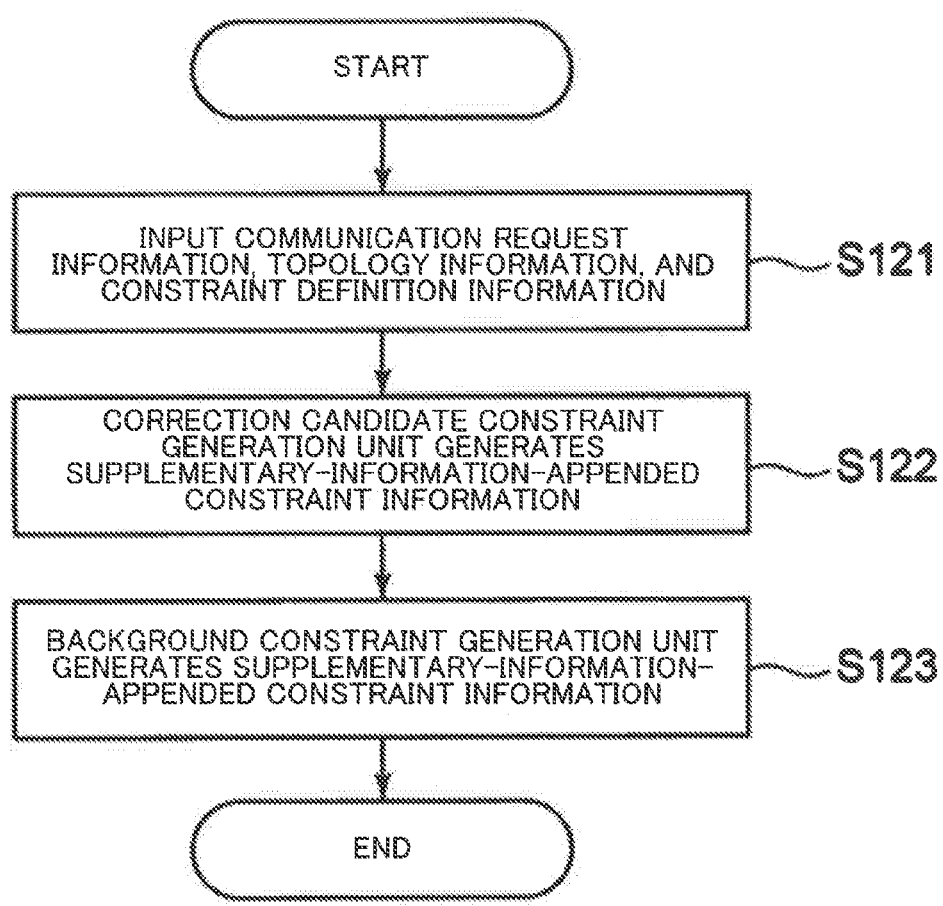
FIG. 12 is a flowchart illustrating an operation of supplementary-information-appended constraint information generation processing by the constraint generation unit 110 in the first example embodiment.

In the following, sub processing constituting the design processing is described. First of all, supplementary-information-appended constraint information generation processing in Step S120 is described. FIG. 12 is a flowchart illustrating an operation of supplementary-information-appended constraint information generation processing by the constraint generation unit 110 in the first example embodiment.

Communication request information and topology information input to the transmission timing scheduler 100 are input to the constraint generation unit 110. Note that, when constraint definition information is input to the transmission timing scheduler 100, the constraint definition information may also be input to the constraint generation unit 110 (Step S121).

Subsequently, the correction candidate constraint generation unit 111 generates supplementary-information-appended constraint information indicating a correction candidate constraint, based on the input information (Step S122). The correction candidate constraint generation unit 111 stores the generated supplementary-information-appended constraint information in the constraint information storing unit 120.

Subsequently, the background constraint generation unit 112 generates supplementary-information-appended constraint information indicating a background constraint, based on the input information (Step S123). The background constraint generation unit 112 stores the generated supplementary-information-appended constraint information in the constraint information storing unit 120. After the storage, the constraint generation unit 110 finishes the supplementary-information-appended constraint information generation processing.

Figure 13:
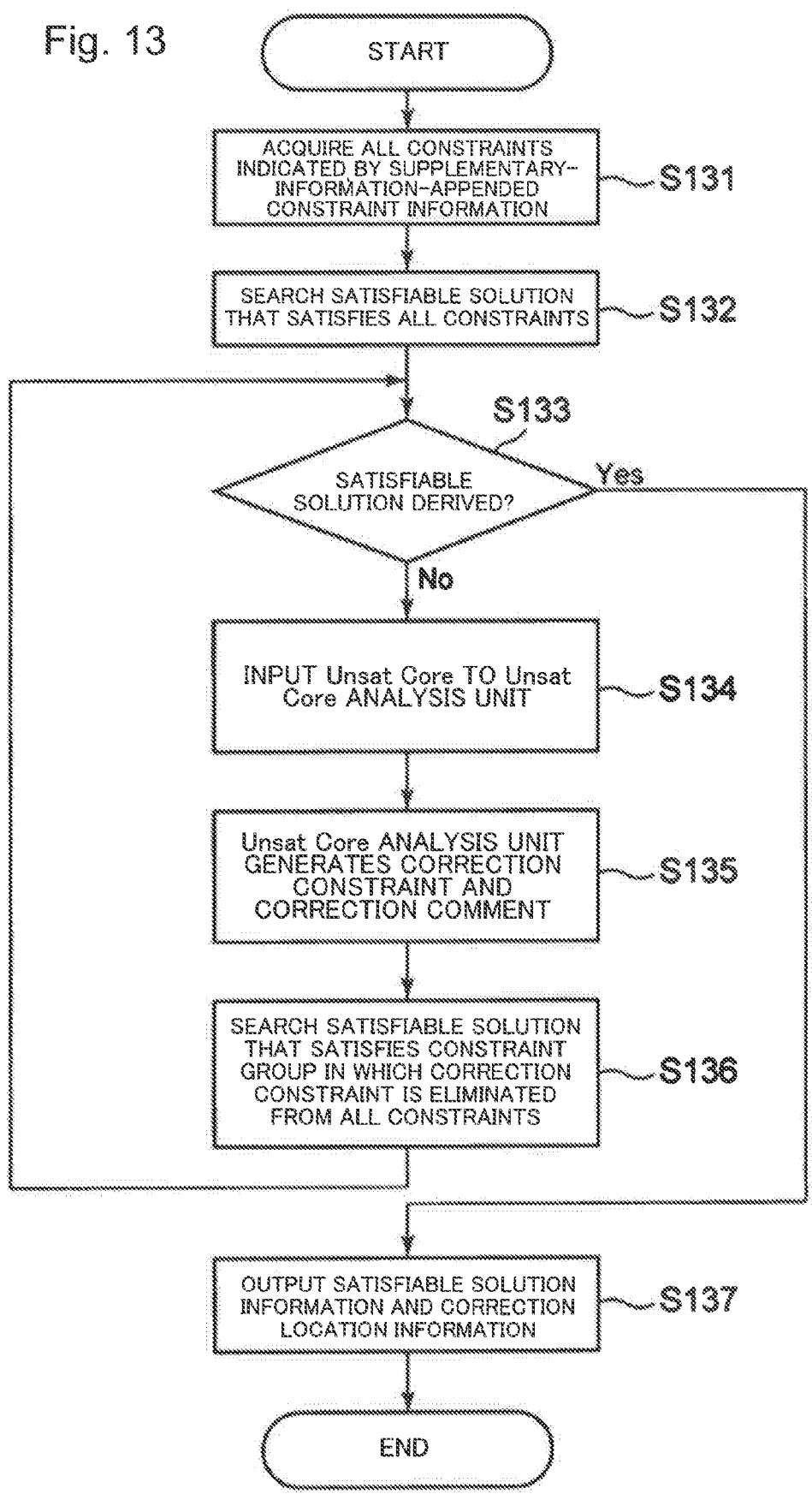
FIG. 13 is a flowchart illustrating an operation of satisfiable solution search processing by the constraint satisfaction problem solving unit 130 in the first example embodiment.

Next, satisfiable solution search processing in Step S130 is described. FIG. 13 is a flowchart illustrating an operation of satisfiable solution search processing by the constraint satisfaction problem solving unit 130 in the first example embodiment.

The constraint satisfaction problem solving unit 130 acquires all constraints indicated by the supplementary-information-appended constraint information stored in the constraint information storing unit 120 (Step S131). Subsequently, the problem solving unit 131 searches a satisfiable solution being a solution that satisfies all the constraints acquired in Step S131 (Step S132).

When a satisfiable solution is not derived (No in Step S133), the problem solving unit 131 outputs an Unsat Core™. The problem solving unit 131 inputs the output Unsat Core™ to the Unsat Core™ unit 132 (Step S134).

Subsequently, the Unsat Core™ unit 132 analyzes the input Unsat Core™, and generates a correction constraint being a constraint as a correction target, and a correction comment with respect to the correction constraint (Step S135). Note that the Unsat Core™ analysis unit 132 stores a generated correction comment until a satisfiable solution is derived.

Subsequently, the problem solving unit 131 re-searches a satisfiable solution that satisfies a constraint group which is acquired by eliminating the correction constraint generated in Step S135 from all the constraints acquired in Step S131 (Step S136).

Note that the problem solving unit 131 may search a satisfiable solution that satisfies a constraint group in which a content of a correction constraint is corrected, in place of a constraint group in which a correction constraint is eliminated in Step S136.

The problem solving unit 131 repeatedly performs processing of Step S133 to Step 136 until a satisfiable solution is derived. Note that, when a processing loop of Step S133 to Step S136 is continuously performed, finally, a correction candidate constraint is not included in a constraint group as a search target of a satisfiable solution, and only a background constraint is included.

Since the background constraint generation unit 112 generates a background constraint in such a way that a satisfiable solution is always present in a constraint satisfaction problem in which only a constraint included in a background constraint group is considered, when only a background constraint is included in a constraint group, the problem solving unit 131 is able to derive a satisfiable solution. Specifically, a processing loop of Step S133 to Step S136 always finishes.

When a satisfiable solution is derived (Yes in Step S133), the problem solving unit 131 outputs satisfiable solution information indicating the derived satisfiable solution, and existing correction location information (Step S137). The correction constraint and the correction comment generated in Step S135 are written in the correction location information to be output. After the output, the constraint satisfaction problem solving unit 130 finishes the satisfiable solution search processing.

Figure 14:
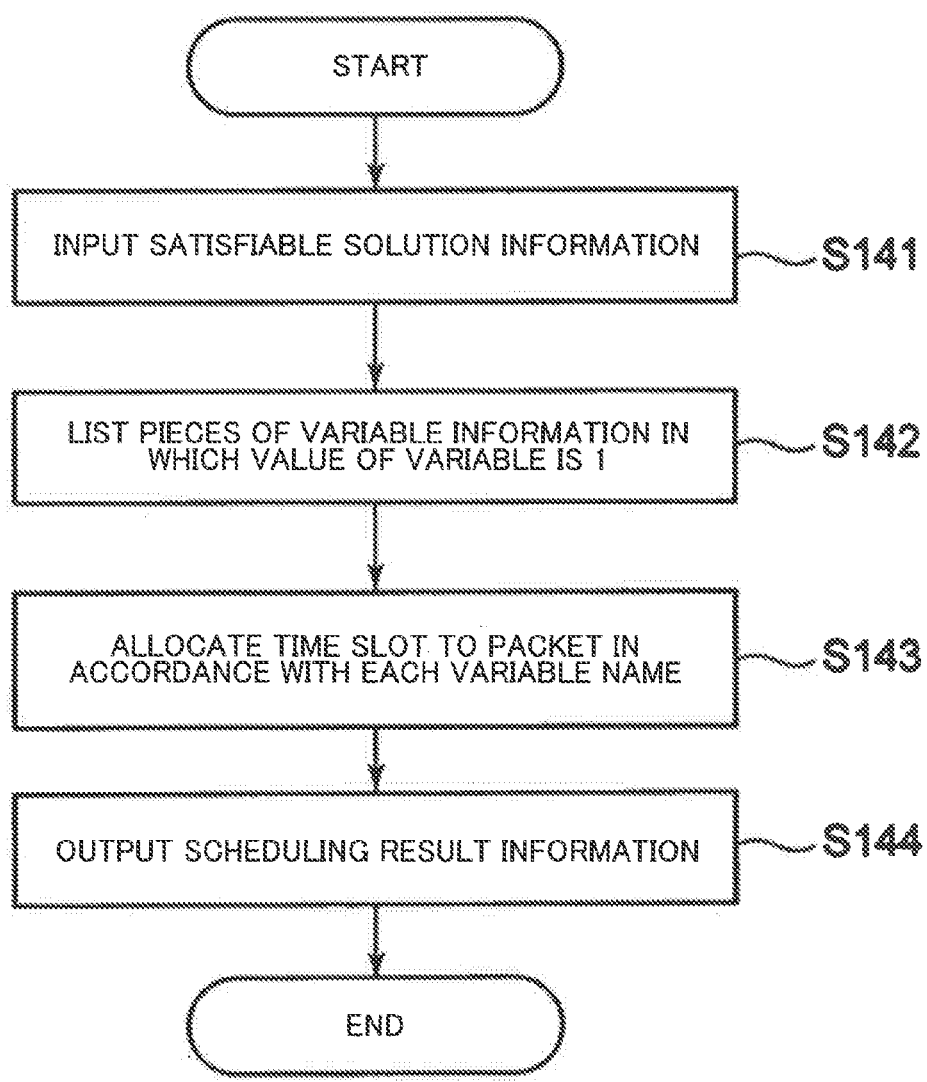
FIG. 14 is a flowchart illustrating an operation of satisfiable solution analysis processing by a satisfiable solution analysis unit 140 in the first example embodiment.

Next, satisfiable solution analysis processing in Step S140 is described. FIG. 14 is a flowchart illustrating an operation of satisfiable solution analysis processing by the satisfiable solution analysis unit 140 in the first example embodiment.

Satisfiable solution information is input from the constraint satisfaction problem solving unit 130 to the satisfiable solution analysis unit 140 (Step S141). Subsequently, the satisfiable solution analysis unit 140 lists all pieces of variable information in which a value of a variable is 1, from the input satisfiable solution information (Step S142).

Subsequently, the satisfiable solution analysis unit 140 allocates a time slot to a packet in accordance with a variable name indicated by each listed piece of variable information (Step S143). After time slot allocation is performed with respect to all pieces of variable information in which a value of a variable is 1, the satisfiable solution analysis unit 140 outputs scheduling result information indicating all results in which a time slot is allocated to a packet (Step S144).

For example, regarding a first piece of variable information illustrated in FIG. 8, the satisfiable solution analysis unit 140 allocates a time slot whose time slot number is "1" to a packet relating to a communication request having a communication request ID=1.

In association with allocation by the satisfiable solution analysis unit 140, "0" is written as a time slot of schedule result information in which a communication request ID illustrated in FIG. 10 is "1". After the output, the satisfiable solution analysis unit 140 finishes the satisfiable solution analysis processing.

Figure 15:
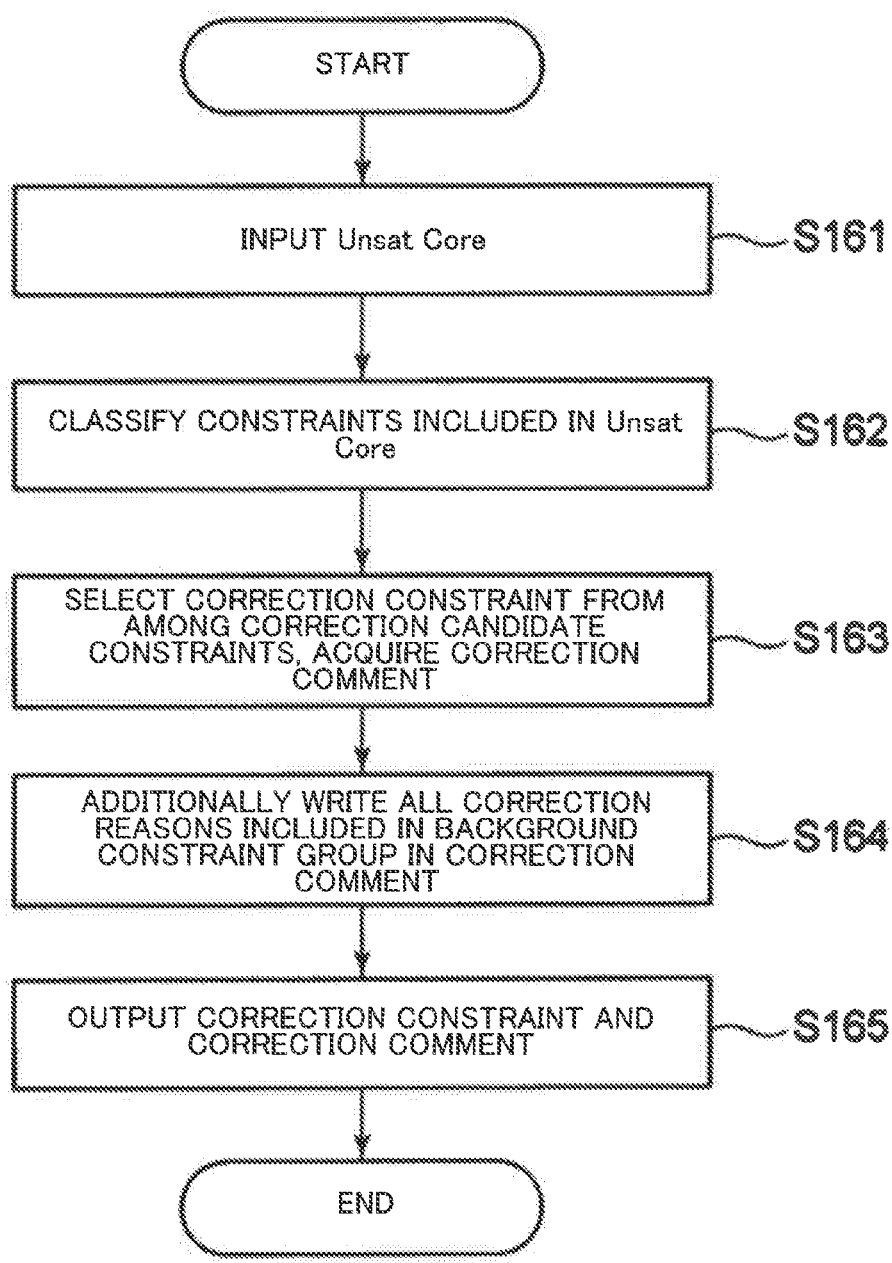
FIG. 15 is a flowchart illustrating an operation of Unsat Core analysis processing by an Unsat Core analysis unit 132 in the first example embodiment.

In the following, Unsat Core™ analysis processing in Step S135 being sub processing constituting the satisfiable solution search processing is described. FIG. 15 is a flowchart illustrating an operation of Unsat Core™ analysis processing by the Unsat Core™ analysis unit 132 in the first example embodiment.

An Unsat Core™ is input to the Unsat Core™ analysis unit 132 (Step S161). Subsequently, the Unsat Core™ analysis unit 132 classifies constraints included in the input Unsat Core™ into correction candidate constraints and background constraints (Step S162). The Unsat Core™ analysis unit 132 classifies constraints by referring to the information stored in the constraint information storing unit 120.

Subsequently, the Unsat Core™ analysis unit 132 selects a correction constraint being a constraint as a correction target from among the classified correction candidate constraints. Further, the Unsat Core™ analysis unit 132 acquires a correction comment associated with the selected correction constraint from supplementary-information-appended constraint information (Step S163). An example illustrated in FIG. 9 is an example of a case where the Unsat Core™ analysis unit 132 selects one correction constraint.

Subsequently, the Unsat Core™ analysis unit 132 additionally writes, in the correction comment, a message indicating all correction reasons included in a background constraint group (Step S164). Subsequently, the Unsat Core™ analysis unit 132 outputs a correction constraint and a correction comment (Step S165). After the output, the Unsat Core™ analysis unit 132 finishes the Unsat Core™ analysis processing.

[Description on Advantageous Effects]

The transmission timing scheduler 100 in the present example embodiment includes the constraint generation unit 110 for generating supplementary-information-appended constraint information to which a tag indicating either a fixed constraint or a correction candidate constraint, and information relating to a correction comment to be presented together with a correction location by a designing device are added.

The constraint generation unit 110 generates supplementary-information-appended constraint information, based on topology information indicating a connection relationship between components included in a communication network, communication request information indicating communication which is requested to be performed by a component included in the communication network, and constraint definition information indicating a constraint which requires consideration when a communication timing is determined. The generated supplementary-information-appended constraint information is used for scheduling of a packet transmission timing with respect to a control component included in the communication network.

Further, the transmission timing scheduler 100 in the present example embodiment includes the constraint satisfaction problem solving unit 130 for outputting satisfiable solution information being variable information of a solution that satisfies either all constraint groups indicated by supplementary-information-appended constraint information, or a constraint group in which a constraint appended with a tag of a correction candidate is corrected. When a satisfiable solution is derived, the constraint satisfaction problem solving unit 130 generates correction location information including a corrected constraint among all constraint groups, and a correction comment with respect to the corrected constraint. Specifically, the constraint satisfaction problem solving unit 130 is able to present a correction location and a correction reason of a constraint group.

Further, the transmission timing scheduler 100 in the present example embodiment includes the satisfiable solution analysis unit 140 for performing scheduling of a packet transmission timing with respect to each control component by using output satisfiable solution information, and generating scheduling result information indicating a scheduling result.

The transmission timing scheduler 100 in the present example embodiment appropriately performs scheduling of a transmission timing in path addressing communication in such a way that a human error and a bandwidth excess in a link do not occur. When scheduling is performed, the constraint satisfaction problem solving unit 130 generates information indicating a corrected communication request and a correction reason of the communication request, and outputs the generated information to the outside.

Specifically, the transmission timing scheduler 100 in the present example embodiment is able to clearly present a designer with a correction reason of a communication request. Therefore, since the designer is able to speedily review design of a communication request, occurrence of a failure due to a human error in communication is prevented. When schedule information of a packet transmission timing generated by the transmission timing scheduler 100 in the present example embodiment is used, communication of high reliability is performed, as compared with a case where schedule information is not used.

Second Example Embodiment

[Description on Configuration]

Figure 16:
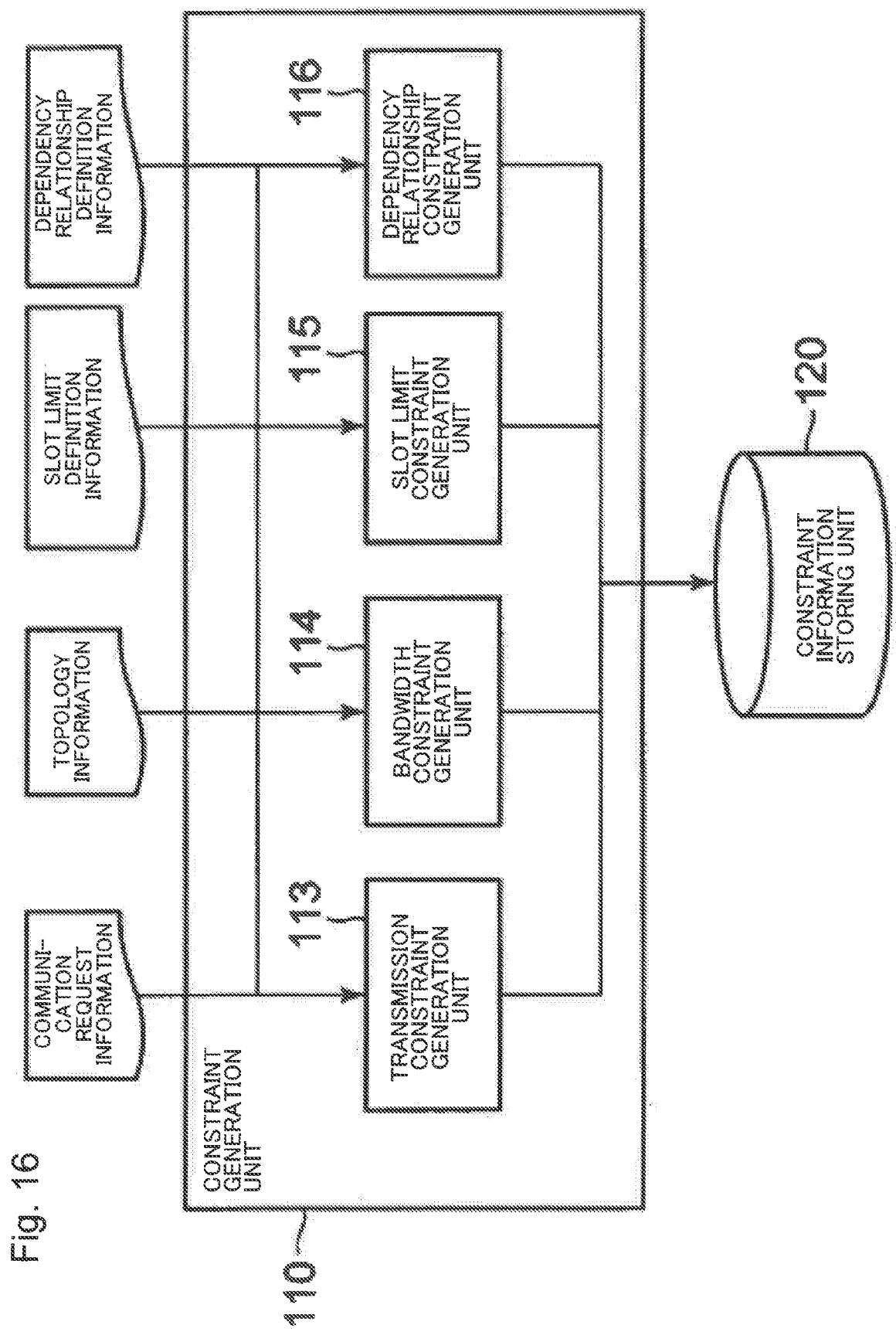
FIG. 16 is a block diagram illustrating a configuration example of a constraint generation unit 110 in a second example embodiment.

Next, a second example embodiment of the present invention is described with reference to the drawings. FIG. 16 is a block diagram illustrating a configuration example of a constraint generation unit 110 in the second example embodiment. As illustrated in FIG. 16, the constraint generation unit 110 in the present example embodiment includes a transmission constraint generation unit 113, a bandwidth constraint generation unit 114, a slot limit constraint generation unit 115, and a dependency relationship constraint generation unit 116.

In the present example embodiment, the transmission constraint generation unit 113 generates supplementary-information-appended constraint information indicating a correction candidate constraint, in place of the correction candidate constraint generation unit 111 in the first example embodiment. Further, in the present example embodiment, the bandwidth constraint generation unit 114, the slot limit constraint generation unit 115, and the dependency relationship constraint generation unit 116 generate supplementary-information-appended constraint information indicating a background constraint, in place of the background constraint generation unit 112 in the first example embodiment.

Further, slot limit definition information and dependency relationship definition information are input to the constraint generation unit 110 in the present example embodiment, in place of constraint definition information in the first example embodiment. Note that a configuration of the second example embodiment other than the constraint generation unit 110 is similar to the configuration of the first example embodiment.

In the following, each constituent element included in the constraint generation unit 110 is described with reference to the drawings. First of all, the transmission constraint generation unit 113 is described.

Communication request information is input to the transmission constraint generation unit 113. The transmission constraint generation unit 113 has a function of generating supplementary-information-appended constraint information, based on input communication request information. Specifically, the transmission constraint generation unit 113 generates one constraint formula with respect to packet entry processing indicated by one piece of communication request information. Specifically, packet entry processing is formulated to a constraint formula.

Further, the transmission constraint generation unit 113 additionally writes, as supplementary information, a "correction candidate" tag and a correction comment in constraint information in which a constraint formula is written. The transmission constraint generation unit 113 stores generated supplementary-information-appended constraint information in a constraint information storing unit 120.

Next, the bandwidth constraint generation unit 114 is described. Communication request information and topology information are input to the bandwidth constraint generation unit 114. The bandwidth constraint generation unit 114 has a function of generating supplementary-information-appended constraint information, based on input communication request information and topology information.

Specifically, the bandwidth constraint generation unit 114 generates a constraint formula, based on an upper limit value of a bandwidth usage rate of each link in each time slot. Further, the bandwidth constraint generation unit 114 additionally writes, as supplementary information, a "background" tag and a correction reason comment in constraint information in which a constraint formula is written. The bandwidth constraint generation unit 114 stores generated supplementary-information-appended constraint information in the constraint information storing unit 120.

Next, the slot limit constraint generation unit 115 is described. Communication request information and slot limit definition information are input to the slot limit constraint generation unit 115. The slot limit constraint generation unit 115 has a function of generating supplementary-information-appended constraint information, based on input communication request information and slot limit definition information. Specifically, the slot limit constraint generation unit 115 generates supplementary-information-appended constraint information indicating a constraint of limiting an alternative of a time slot to be allocated, which depends on a type of packet.

For example, in a standard specification of SpaceWire™-D, allocating a $(4n+1)$-th time slot to a communication packet indicating that a type of service to be provided is collecting observation data, and the like are defined. The slot limit constraint generation unit 115 is able to generate supplementary-information-appended constraint information relating to a rule on a time slot to be allocated.

The slot limit constraint generation unit 115 generates one constraint formula with respect to a condition on one time slot to be allocated. Further, the slot limit constraint generation unit 115 additionally writes, as supplementary information, a "background" tag and a correction reason comment in constraint information in which a constraint formula is written. The slot limit constraint generation unit 115 stores generated supplementary-information-appended constraint information in the constraint information storing unit 120.

In the following, slot limit definition information to be input to the slot limit constraint generation unit 115 is described. FIG. 17 is an explanatory diagram illustrating an example of a slot limit definition information list. The slot limit definition information list illustrated in FIG. 17 is constituted of a plurality of pieces of slot limit definition information. Note that a format of slot limit definition information is not limited to the format illustrated in FIG. 17.

As illustrated in FIG. 17, slot limit definition information is constituted of a slot limit ID, an allowable time slot, an RMAP address, a command, and a reply. The slot limit constraint generation unit 115 generates one piece of supplementary-information-appended constraint information, based on one piece of slot limit definition information.

A slot limit ID is an identifier for identifying slot limit definition information. A slot limit ID is used in such a way that "violate a condition written in slot limit definition information having a slot limit ID=n", and the like are written in a correction comment of correction location information illustrated in FIG. 9, for example.

An RMAP address, a command, and a reply are information relating to a packet as a slot limit target associated with a slot limit ID. Note that an RMAP address, a command, and a reply are also included in communication request information.

"-" is written in a reply of slot limit definition information in which a slot limit ID is "3". Specifically, regarding a packet as a slot limit target associated with a slot limit ID "3", a reply may be either "present" or "not present".

An allowable time slot indicates a time slot number for which allocation to a packet as a slot limit target associated with a slot limit ID is allowed. As illustrated in FIG. 17, a plurality of numbers are written in an allowable time slot. Note that only one number may be written in an allowable time slot.

Next, the dependency relationship constraint generation unit 116 is described. Communication request information and dependency relationship definition information are input to the dependency relationship constraint generation unit 116. The dependency relationship constraint generation unit 116 has a function of generating supplementary-information-appended constraint information, based on input communication request information and dependency relationship definition information.

Specifically, the dependency relationship constraint generation unit 116 generates a constraint formula, based on a dependency relationship between communications.

For example, the dependency relationship constraint generation unit 116 generates a constraint formula, based on a rule that a time slot number later than a time slot number allocated to communication by which polling is performed is allocated to communication by which an observation component performs data collection, and the like.

The dependency relationship constraint generation unit 116 generates one constraint formula for each link within a network with respect to each time slot. Further, the dependency relationship constraint generation unit 116 additionally writes, as supplementary information, a "background" tag and a correction reason comment in constraint information in which a constraint formula is written. The dependency relationship constraint generation unit 116 stores generated supplementary-information-appended constraint information in the constraint information storing unit 120.

In the following, dependency relationship definition information to be input to the dependency relationship constraint generation unit 116 is described. FIG. 18 is an explanatory diagram illustrating an example of a dependency relationship definition information list. The dependency relationship definition information list illustrated in FIG. 18 is constituted of a plurality of pieces of dependency relationship definition information. Note that a format of dependency relationship definition information is not limited to the format illustrated in FIG. 18.

As illustrated in FIG. 18, dependency relationship definition information is constituted of a dependency relationship ID, a preferential RMAP address, a preferential command, a preferential reply, a subordinate RMAP address, a subordinate command, a subordinate reply, and a time slot interval. The dependency relationship constraint generation unit 116 generates one piece of supplementary-information-appended constraint information, based on one piece of dependency relationship definition information.

A dependency relationship ID is an identifier for identifying dependency relationship definition information. Further, a preferential RMAP address, a preferential command, and a preferential reply are information relating to a preferential packet being a packet to which a time slot is preferentially allocated.

Further, a subordinate RMAP address, a subordinate command, and a subordinate reply are information relating to a subordinate packet being a packet to which a time slot is allocated following a preferential packet. Further, a time slot interval is a slot interval between a time slot to which a preferential packet is allocated, and a time slot to which a subordinate packet is allocated.

For example, when a time slot interval of dependency relationship definition information is "m", and an n-th time slot is allocated to a preferential packet indicated by the dependency relationship definition information, an (n+m)-th time slot is allocated to a subordinate packet indicated by the dependency relationship definition information.

Further, a time slot interval of dependency relationship definition information may not be designated. When a value is not designated, a section of a time slot interval becomes blank. Alternatively, a wild card such as "*" may be written as a time slot interval.

The dependency relationship constraint generation unit 116 generates a constraint formula "x<y" by assuming that a time slot number to be allocated to a preferential packet is x and a time slot number to be allocated to a subordinate packet is y, based on dependency relationship definition information in which a time slot interval is not designated. As described above, the dependency relationship constraint generation unit 116 generates supplementary-information-appended constraint information.

Note that, also in the present example embodiment, a correction candidate constraint group and a background constraint group are generated in such a way that a satisfiable solution is always present. Specifically, a constraint group to be generated in the present example embodiment has a same property as a constraint group to be generated in the first example embodiment.

[Description on Operation]

Figure 19:
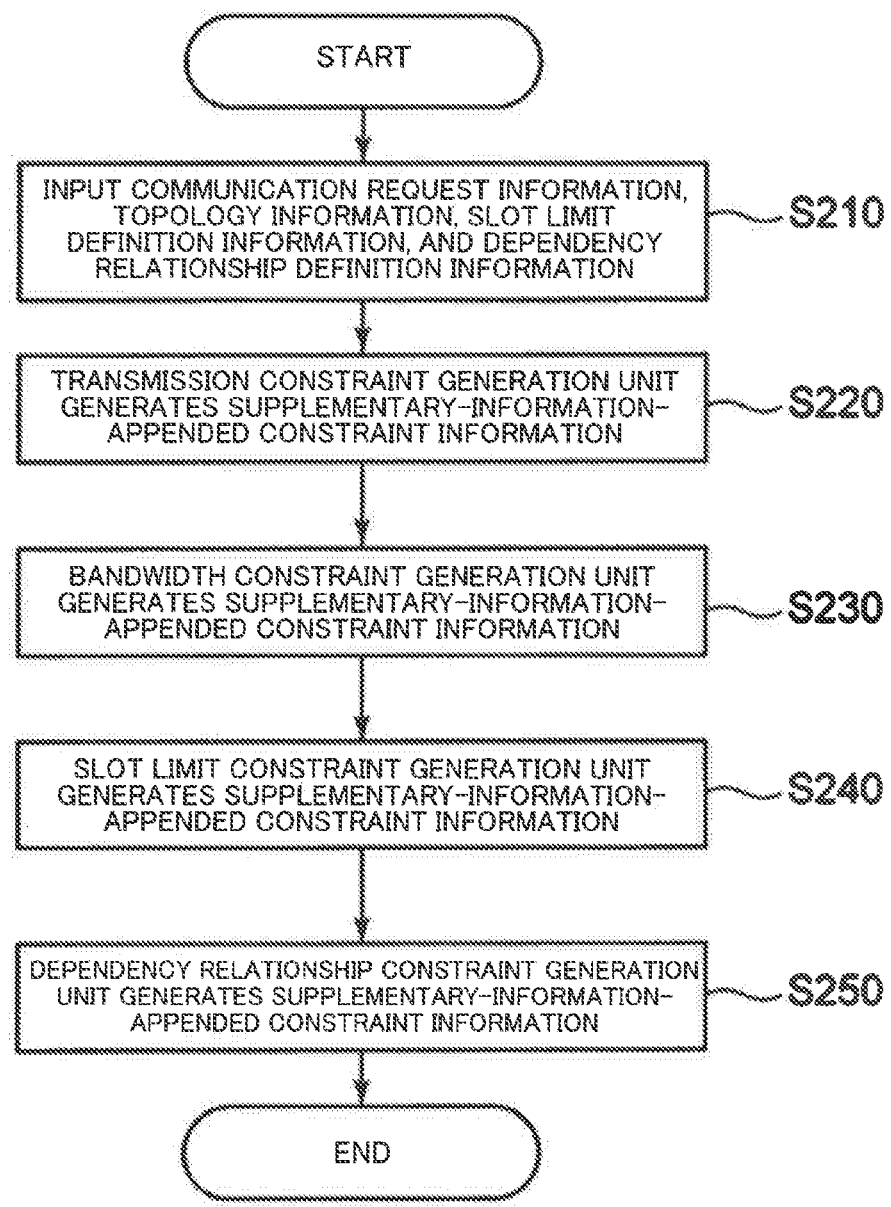
FIG. 19 is a flowchart illustrating an operation of supplementary-information-appended constraint information generation processing by the constraint generation unit 110 in the second example embodiment.

In the following, an operation of the constraint generation unit 110 in the present example embodiment is described with reference to FIG. 19 to FIG. 23. FIG. 19 is a flowchart illustrating an operation of supplementary-information-appended constraint information generation processing by the constraint generation unit 110 in the second example embodiment.

Note that an overall operation of design processing by a transmission timing scheduler 100 in the present example embodiment is similar to an overall operation illustrated in FIG. 11. Specifically, processing illustrated in FIG. 19 corresponds to supplementary-information-appended constraint information generation processing in Step S120 illustrated in FIG. 11.

Communication request information, topology information, slot limit definition information, and dependency relationship definition information input to the transmission timing scheduler 100 are input to the constraint generation unit 110 (Step S210).

Subsequently, the transmission constraint generation unit 113 generates supplementary-information-appended information indicating a transmission constraint, based on the input information (Step S220). The transmission constraint generation unit 113 stores the generated supplementary-information-appended information in the constraint information storing unit 120.

Subsequently, the bandwidth constraint generation unit 114 generates supplementary-information-appended information indicating a bandwidth constraint, based on the input information (Step S230). The bandwidth constraint generation unit 114 stores the generated supplementary-information-appended constraint information in the constraint information storing unit 120.

Subsequently, the slot limit constraint generation unit 115 generates supplementary-information-appended constraint information indicating a slot limit constraint, based on the input information (Step S240). The slot limit constraint generation unit 115 stores the generated supplementary-information-appended constraint information in the constraint information storing unit 120.

Subsequently, the dependency relationship constraint generation unit 116 generates supplementary-information-appended constraint information indicating a dependency relationship constraint, based on the input information (Step S250). The dependency relationship constraint generation unit 116 stores the generated supplementary-information-appended constraint information in the constraint information storing unit 120. After the storage, the constraint generation unit 110 finishes the supplementary-information-appended constraint information generation processing.

Figure 20:
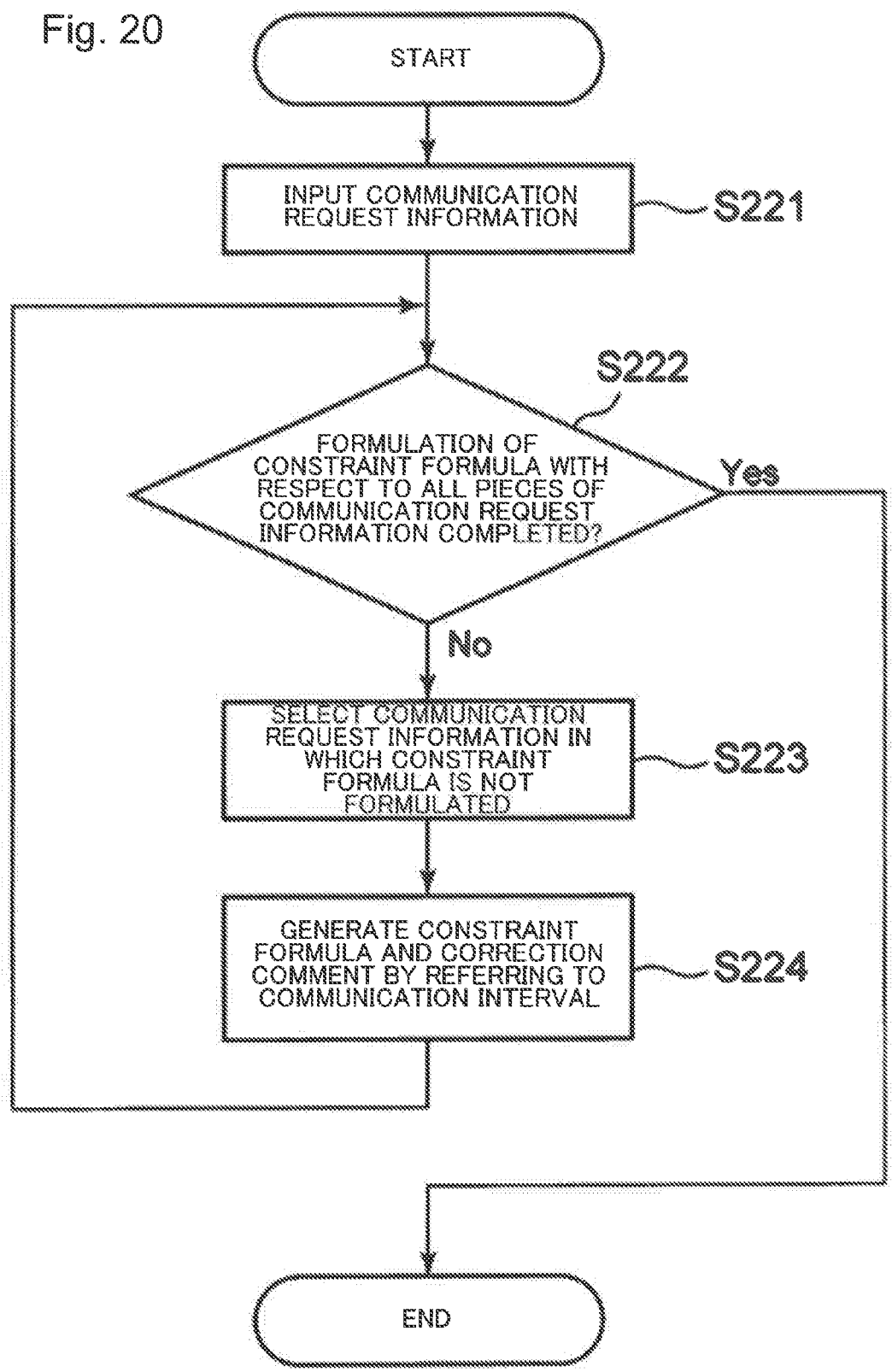
FIG. 20 is a flowchart illustrating an operation of transmission constraint generation processing by a transmission constraint generation unit 113 in the second example embodiment.

In the following, sub processing constituting the supplementary-information-appended constraint information generation processing is described. First of all, transmission constraint generation processing in Step S220 is described. FIG. 20 is a flowchart illustrating an operation of transmission constraint generation processing by the transmission constraint generation unit 113 in the second example embodiment.

Communication request information input to the constraint generation unit 110 is input to the transmission constraint generation unit 113 (Step S221). Subsequently, the transmission constraint generation unit 113 confirms whether or not formulation of a constraint formula with respect to all pieces of input communication request information is completed (Step S222).

When formulation of a constraint formula with respect to all pieces of communication request information is not completed (No in Step S222), the transmission constraint generation unit 113 selects communication request information in which a constraint formula is not formulated, from among the pieces of input communication request information (Step S223).

Subsequently, the transmission constraint generation unit 113 generates a constraint formula and a correction comment by referring to a communication interval of the selected communication request information (Step S224). Subsequently, the transmission constraint generation unit 113 generates supplementary-information-appended constraint information including the generated constraint formula and correction comment. After the generation, the transmission constraint generation unit 113 performs processing in Step S222 again.

When formulation of a constraint formula with respect to all pieces of communication request information is completed (Yes in Step S222), the transmission constraint generation unit 113 finishes the transmission constraint generation processing.

Figure 21:
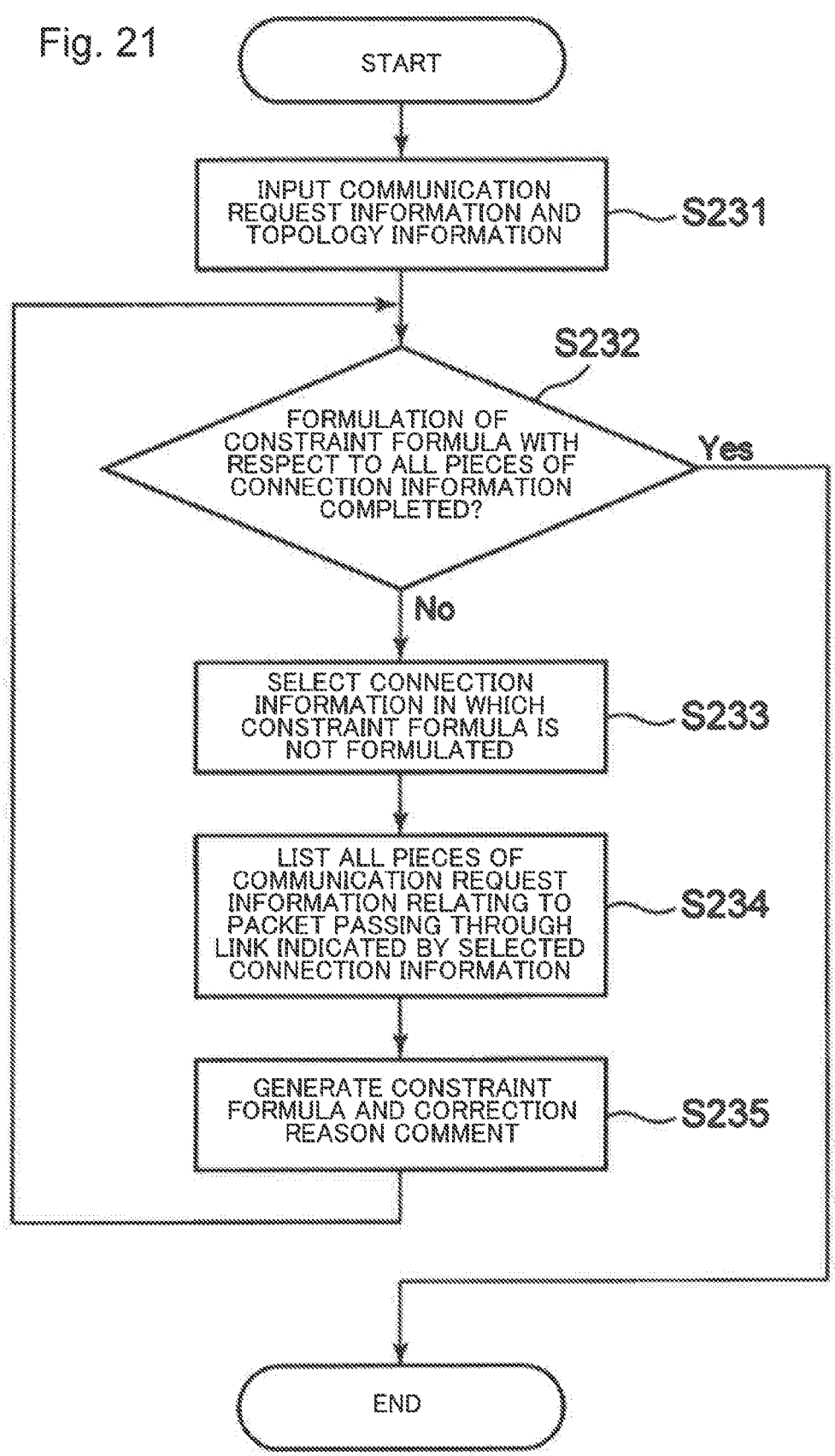
FIG. 21 is a flowchart illustrating an operation of bandwidth constraint generation processing by a bandwidth constraint generation unit 114 in the second example embodiment.

Next, bandwidth constraint generation processing in Step S230 is described. FIG. 21 is a flowchart illustrating an operation of bandwidth constraint generation processing by the bandwidth constraint generation unit 114 in the second example embodiment.

Communication request information and topology information input to the constraint generation unit 110 are input to the bandwidth constraint generation unit 114 (Step S231). Subsequently, the bandwidth constraint generation unit 114 confirms whether or not formulation of a constraint formula with respect to all pieces of connection information included in the input topology information is completed (Step S232).

When formulation of a constraint formula with respect to all pieces of connection information is not completed (No in Step S232), the bandwidth constraint generation unit 114 selects connection information in which a constraint formula is not formulated, from among the pieces of input connection information (Step S233).

Subsequently, the bandwidth constraint generation unit 114 lists all pieces of communication request information relating to a packet passing through a link indicated by a link ID of the selected connection information (Step S234). Subsequently, the bandwidth constraint generation unit 114 generates a constraint formula and a correction reason comment relating to a bandwidth, based on the listed pieces of communication request information (Step S235).

Subsequently, the bandwidth constraint generation unit 114 generates supplementary-information-appended constraint information including the generated constraint formula and correction reason comment. After the generation, the bandwidth constraint generation unit 114 performs processing in Step S232 again.

When formulation of a constraint formula with respect to all pieces of connection information is completed (Yes in Step S232), the bandwidth constraint generation unit 114 finishes the bandwidth constraint generation processing.

Figure 22:
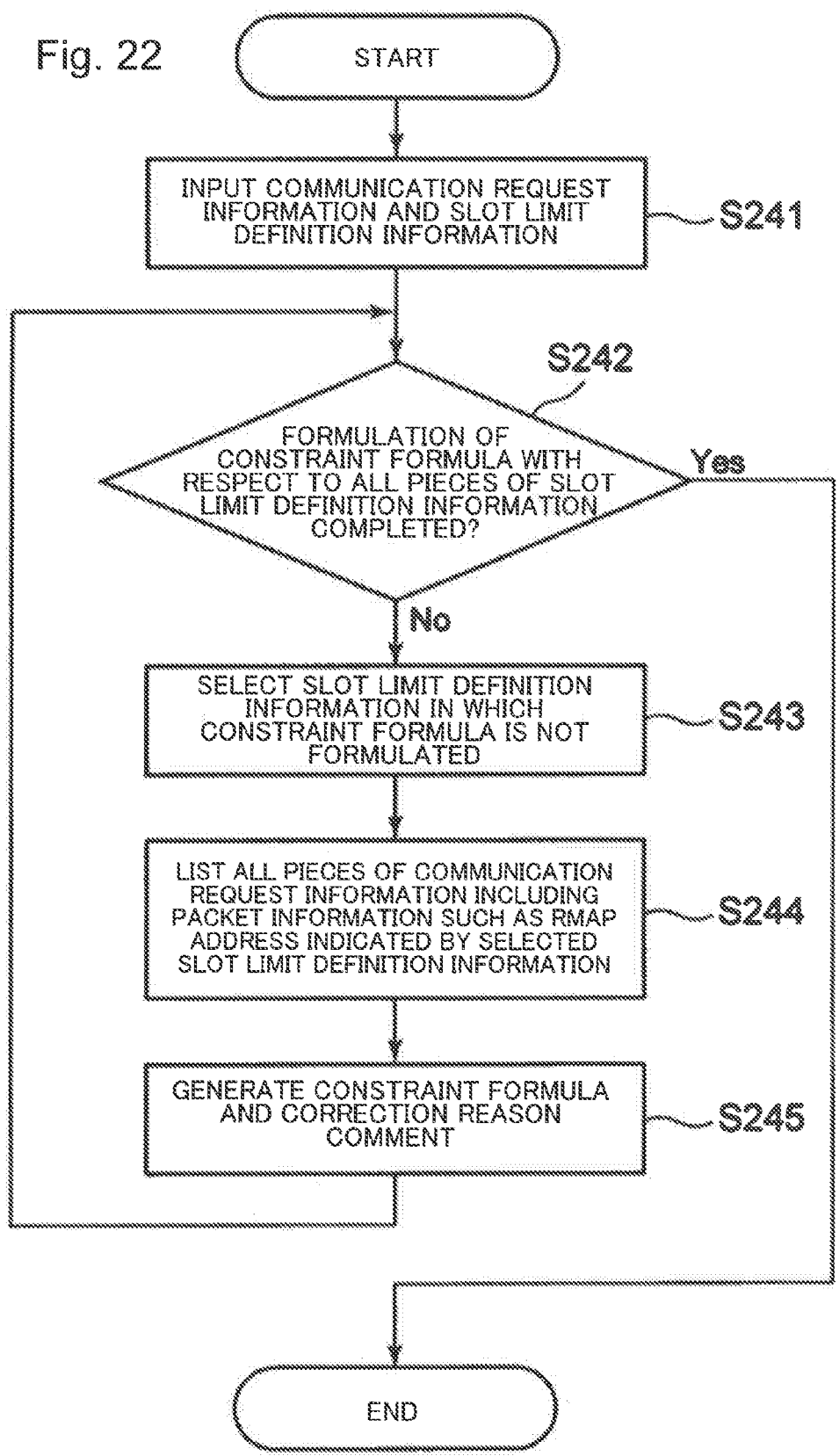
FIG. 22 is a flowchart illustrating an operation of slot limit constraint generation processing by a slot limit constraint generation unit 115 in the second example embodiment.

Next, slot limit constraint generation processing in Step S240 is described. FIG. 22 is a flowchart illustrating an operation of slot limit constraint generation processing by the slot limit constraint generation unit 115 in the second example embodiment.

Communication request information and slot limit definition information input to the constraint generation unit 110 are input to the slot limit constraint generation unit 115 (Step S241). Subsequently, the slot limit constraint generation unit 115 confirms whether or not formulation of a constraint formula with respect to the input slot limit definition information is completed (Step S242).

When formulation of a constraint formula with respect to all pieces of slot limit definition information is not completed (No in Step S242), the slot limit constraint generation unit 115 selects slot limit definition information in which a constraint formula is not formulated, from among the pieces of input slot limit definition information (Step S243).

Subsequently, the slot limit constraint generation unit 115 lists all pieces of communication request information including packet information such as an RMAP address defined by the selected slot limit definition information (Step S244). Subsequently, the slot limit constraint generation unit 115 generates a constraint formula and a correction reason comment, based on the listed pieces of communication request information, and an allowable time slot defined by the selected slot limit definition information (Step S245).

Subsequently, the slot limit constraint generation unit 115 generates supplementary-information-appended constraint information including the generated constraint formula and correction reason comment. After the generation, the slot limit constraint generation unit 115 performs processing in Step S242 again.

When formulation of a constraint formula with respect to all pieces of slot limit definition information is completed (Yes in Step S242), the slot limit constraint generation unit 115 finishes the slot limit constraint generation processing.

Figure 23:
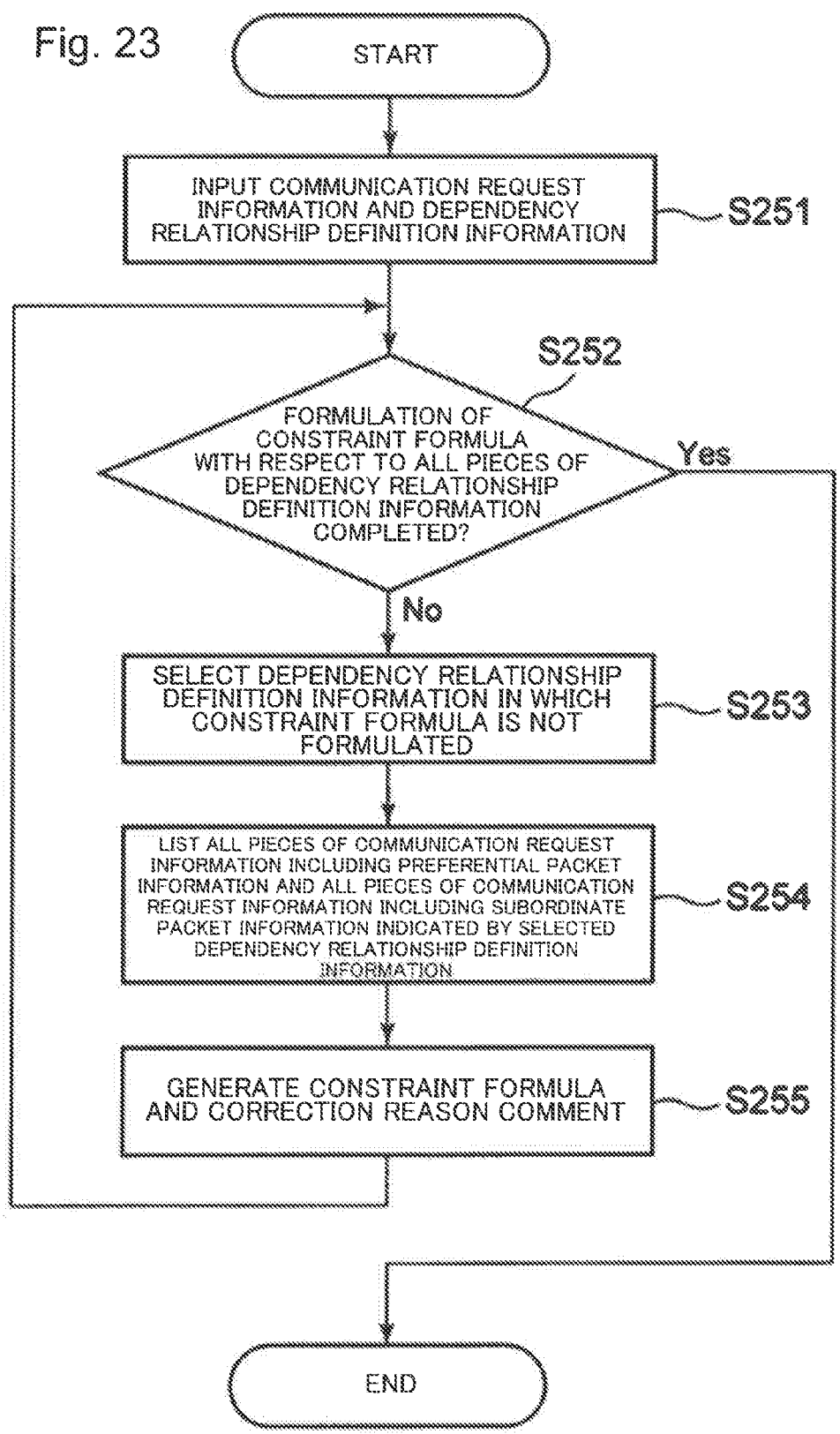
FIG. 23 is a flowchart illustrating an operation of dependency relationship constraint generation processing by a dependency relationship constraint generation unit 116 in the second example embodiment.

Next, dependency relationship constraint generation processing in Step S250 is described. FIG. 23 is a flowchart illustrating an operation of dependency relationship constraint generation processing by the dependency relationship constraint generation unit 116 in the second example embodiment.

Communication request information and dependency relationship definition information input to the constraint generation unit 110 are input to the dependency relationship constraint generation unit 116 (Step S251). Subsequently, the dependency relationship constraint generation unit 116 confirms whether or not formulation of a constraint formula with respect to the input dependency relationship definition information is completed (Step S252).

When formulation of a constraint formula with respect to all pieces of dependency relationship definition information is not completed (No in Step S252), the dependency relationship constraint generation unit 116 selects dependency relationship definition information in which a constraint formula is not formulated, from among the pieces of input dependency relationship definition information (Step S253).

Subsequently, the dependency relationship constraint generation unit 116 lists all pieces of communication request information including preferential packet information defined by the selected dependency relationship definition information, and all pieces of communication request information including subordinate packet information defined by the selected dependency relationship definition information (Step S254).

Subsequently, the dependency relationship constraint generation unit 116 generates a constraint formula and a correction reason comment, based on the listed pieces of communication request information, and a time slot interval defined by the selected dependency relationship definition information (Step S255).

Subsequently, the dependency relationship constraint generation unit 116 generates supplementary-information-appended constraint information including the generated constraint formula and correction reason comment. After the generation, the dependency relationship constraint generation unit 116 performs processing in Step S252 again.

When formulation of a constraint formula with respect to all pieces of dependency relationship definition information is completed (Yes in Step S252), the dependency relationship constraint generation unit 116 finishes the dependency relationship constraint generation processing.

[Description on Advantageous Effects]

The constraint generation unit 110 of the transmission timing scheduler 100 in the present example embodiment is able to generate supplementary-information-appended constraint information depending on various pieces of input information. Therefore, the transmission timing scheduler 100 is able to generate a schedule of a packet transmission timing to be used by a communication network in which setting is more complex.

Note that, in each example embodiment, description is made based on a premise that a system to be designed by the transmission timing scheduler 100 is a sub system employing a SpaceWire™ network. However, a system to be designed by the transmission timing scheduler 100 in each example embodiment is not limited to a system employing a SpaceWire™ network, as far as the system is a system in which a packet is transmitted by using a time slot. Further, a system to be designed by the transmission timing scheduler 100 in each example embodiment is not limited to a sub system.

Further, description is made based on a premise that each constituent element in each example embodiment directly transmits or outputs information to other constituent elements. In addition to directly transmitting or outputting information, each constituent element may temporarily store generated information and received information in a storing unit included in each example embodiment, read the information from the storing unit, and transmit or output the information to another constituent element.

Note that the transmission timing scheduler 100 in the present example embodiment is implemented by a central processing unit (CPU) for executing processing in accordance with a program stored in a storage medium, for example. Specifically, the constraint generation unit 110, the constraint satisfaction problem solving unit 130, and the satisfiable solution analysis unit 140 are implemented by a CPU for executing processing in accordance with program control, for example.

Further, the constraint information storing unit 120 is implemented by a random access memory (RAM), for example.

Further, each unit of the transmission timing scheduler 100 in the present example embodiment may be implemented by a hardware circuit.

Figure 24:
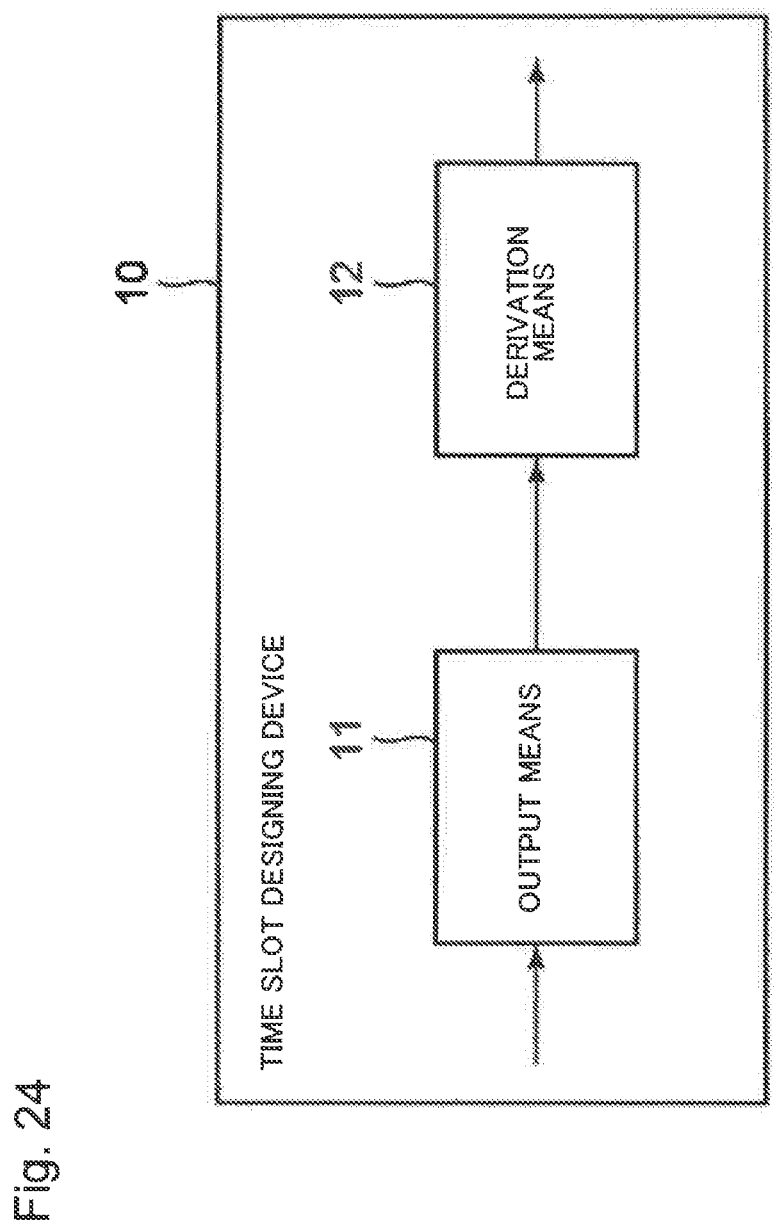
FIG. 24 is a block diagram illustrating an overview of a time slot designing device according to the present invention.

Next, an overview of the present invention is described. FIG. 24 is a block diagram illustrating an overview of a time slot designing device according to the present invention. A time slot designing device 10 according to the present invention includes an output means 11 (e.g., the Unsat Core™ analysis unit 132) for outputting a correction constraint being a constraint as a correction target included in a constraint group (e.g., an Unsat Core™) relating to a constraint satisfaction problem from which a satisfiable solution is not derived, and a correction reason being a reason why the correction constraint is corrected; and a derivation means 12 (e.g., the problem solving unit 131) for deriving a satisfiable solution of a constraint satisfaction problem generated based on the constraint group in which the output correction constraint is corrected. The derivation means 12 outputs information indicating the correction constraint and the correction reason that are output up until the satisfiable solution is derived.

By the above-described configuration, the time slot designing device is able to output a correction location and a correction reason of a constraint relating to a slot allocation result that satisfies a corrected constraint.

Further, the time slot designing device 10 may include a generation means (e.g., the constraint generation unit 110) for generating a constraint included in the constraint group.

By the above-described configuration, the time slot designing device is able to output a slot allocation result associated with input information.

Further, the generation means may include a correction candidate constraint generation means (e.g., the correction candidate constraint generation unit 111) for generating a constraint as a correction candidate, and a fixed constraint generation means (e.g., the background constraint generation unit 112) for generating a fixed constraint other than a constraint as a correction target.

Further, the output means 11 may generate a correction reason, based on all fixed constraints included in the constraint group.

By the above-described configuration, the time slot designing device is able to generate a correction reason with respect to a correction constraint, based on a fixed constraint.

Further, the output means 11 may classify constraints included in the constraint group into the constraints as the correction candidates, and the fixed constraints, and select the correction constraint to be output from among the classified constraints as the correction candidates.

By the above-described configuration, the time slot designing device is able to present a designer with a constraint for which correction is considered.

Further, the time slot designing device 10 may include an allocation means (e.g., the satisfiable solution analysis unit 140) for allocating a time slot to a packet by using the derived satisfiable solution.

By the above-described configuration, the time slot designing device is able to design a time slot table by using a satisfiable solution of a constraint satisfaction problem.

Further, the derivation means 12 may input, to the output means 11, the constraint group relating to a constraint satisfaction problem from which the satisfiable solution is not derived.

By the above-described configuration, the time slot designing device is also able to handle a case where a satisfiable solution is not derived by first processing.

Further, a correction candidate constraint generation means and a fixed constraint generation means may add, to a generated constraint, information relating to a correction reason output from the output means 11.

Further, the correction candidate constraint generation means may include a transmission constraint generation means (e.g., the transmission constraint generation unit 113) for generating a constraint as a correction candidate by using communication request information as an input, and based on a request of causing a control component written in the communication request information to transmit a packet.

Further, the fixed constraint generation means may include a bandwidth constraint generation means (e.g., the bandwidth constraint generation unit 114) for generating a fixed constraint indicating a condition on a bandwidth usable by each link within a communication network by using topology information and communication request information as an input.

Further, the fixed constraint generation means may include a slot limit constraint generation means (e.g., the slot limit constraint generation unit 115) for generating a fixed constraint indicating a condition on a time slot allocatable for each type of communication by using slot limit definition information and communication request information as an input.

Further, the fixed constraint generation means may include a dependency relationship constraint generation means (e.g., the dependency relationship constraint generation unit 116) for generating a fixed constraint indicating a condition on a preferential order in which communication is performed, and a time slot interval between communications by using dependency relationship definition information and communication request information as an input.

In the foregoing, the invention of the present application is described with reference to example embodiments. The invention of the present application, however, is not limited to the above-described example embodiments. A configuration and details of the invention of the present application may be modified in various ways comprehensible to a person skilled in the art within the scope of the invention of the present application.

This application is based upon and claims the benefit of priority based on Japanese patent application No. 2016-079520 filed on Apr. 12, 2016, the disclosure of which is incorporated herein in its entirety by reference.

INDUSTRIAL APPLICABILITY

The present invention is appropriately applied to designing of an intra-satellite network including an interface in conformity with a SpaceWire™ specification. Further, the present invention is appropriately applied to initial designing at an initial stage of development of an intra-satellite network, and design inspection when satellite testing is performed. Further, the present invention is appropriately applied to designing of a component included in a communication network in which path addressing communication employing a source routing method is performed, and a test of a component.

REFERENCE SIGNS LIST

10 Time slot designing device
11 Output means
12 Derivation means
100 Transmission timing scheduler
110 Constraint generation unit
111 Correction candidate constraint generation unit
112 Background constraint generation unit
113 Transmission constraint generation unit
114 Bandwidth constraint generation unit
115 Slot limit constraint generation unit
116 Dependency relationship constraint generation unit
120 Constraint information storing unit
130 Constraint satisfaction problem solving unit
131 Problem solving unit
132 Unsat Core™ analysis unit
140 Satisfiable solution analysis unit
200 SpaceWire™ network
201 System control component
202 Communication component
203 Power supply component
204 Posture-system control component
205 Observation-system control component
206A to 206E, 206X, 206Y Router
210A to 210B Mounted component
214A to 214B Posture control component
215A to 215X Observation component

What is claimed is:

1. A time slot designing device comprising: a processor; and a memory storing instructions executable by the processor to: output a correction constraint being a constraint as a correction target included in a constraint group relating to a constraint satisfaction problem from which a satisfiable solution is not derived, and a correction reason being a reason why the correction constraint is corrected; and derive the satisfiable solution of the constraint satisfaction problem generated based on the constraint group in which the output correction constraint is corrected, generate a constraint included in the constraint group, wherein derivation of the satisfiable solution outputs information indicating the correction constraint and the correction reason that are output up until the satisfiable solution is derived, generation of the constraint generates a correction candidate, and generates a fixed constraint other than the constraint as a correction target, in generating the constraint as the correction candidate, generating the constraint as the correction candidate so that there is always the satisfiable solution to the constraint satisfaction problem in which only the constraints included in the constraint as the correction candidate are considered, in generating the fixed constraint, generating the fixed constraint so that there is always the satisfiable solution to the constraint satisfaction problem in which only the constraints included in the fixed constraint are considered, in generating the constraint as the correction candidate and generating the fixed constraint, when there is no satisfiable solution to the constraint satisfaction problem in which all of the constraint as the correction candidate and the fixed constraint are considered, being set so that both the constraints included in a modification candidate constraints and the constraints included in a background constraints are always included in a partial constraints having an inconsistency in all original constraint groups.

2. The time slot designing device according to claim 1, wherein
output of the correction constraint includes classification of constraints included in the constraint group into the constraints as the correction candidates, and the fixed constraints, and selection of the correction constraint to be output from among the classified constraints as the correction candidates.

3. The time slot designing device according to claim 1, wherein the instructions are executable by the processor to further allocate a time slot to a packet by using the derived satisfiable solution.

4. The time slot designing device according to claim 1, wherein
derivation of the satisfiable solution includes providing the constraint group relating to the constraint satisfaction problem from which the satisfiable solution is not derived.

5. A time slot designing method comprising: outputting a correction constraint being a constraint as a correction target included in a constraint group relating to a constraint satisfaction problem from which a satisfiable solution is not derived, and a correction reason being a reason why the correction constraint is corrected; deriving the satisfiable solution of the constraint satisfaction problem generated based on the constraint group in which the output correction constraint is corrected; generating a constraint included in the constraint group; and outputting information indicating the correction constraint and the correction reason that are output up until the satisfiable solution is derived, wherein generation of the constraint generates a correction candidate, and generates a fixed constraint other than the constraint as a correction target, in generating the constraint as the correction candidate, generating the constraint as the correction candidate so that there is always the satisfiable solution to the constraint satisfaction problem in which only the constraints included in the constraint as the correction candidate are considered, in generating the fixed constraint, generating the fixed constraint so that there is always the satisfiable solution to the constraint satisfaction problem in which only the constraints included in the fixed constraint are considered, in generating the constraint as the correction candidate and generating the fixed constraint, when there is no satisfiable solution to the constraint satisfaction problem in which all of the constraint as the correction candidate and the fixed constraint are considered, being set so that both the constraints included in a modification candidate constraints and the constraints included in a background constraints are always included in a partial constraints having an inconsistency in all original constraint groups.

6. A non-transitory computer readable medium having a time slot designing program stored thereon, the time slot designing program causing a computer to execute: output processing of outputting a correction constraint being a constraint as a correction target included in a constraint group relating to a constraint satisfaction problem from which a satisfiable solution is not derived, and a correction reason being a reason why the correction constraint is corrected; derivation processing of deriving the satisfiable solution of the constraint satisfaction problem generated based on the constraint group in which the output correction constraint is corrected; generating a constraint included in the constraint groups; and information output processing of outputting information indicating the correction constraint and the correction reason that are output up until the satisfiable solution is derived, wherein generation of the constraint generates a correction candidate, and generates a fixed constraint other than the constraint as a correction target, in generating the constraint as the correction candidate, generating the constraint as the correction candidate so that there is always the satisfiable solution to the constraint satisfaction problem in which only the constraints included in the constraint as the correction candidate are considered, in generating the fixed constraint, generating the fixed constraint so that there is always the HQ satisfiable solution to the constraint satisfaction problem in which only the constraints included in the fixed constraint are considered, in generating the constraint as the correction candidate and generating the fixed constraint, when there is no satisfiable solution to the constraint satisfaction problem in which all of the constraint as the correction candidate and the fixed constraint are considered, being set so that both the constraints included in a modification candidate constraints and the constraints included in a background constraints are always included in a partial constraints having an inconsistency in all original constraint groups.

* * * * *